United States Patent
Boright et al.

(10) Patent No.: US 7,184,890 B2
(45) Date of Patent: Feb. 27, 2007

(54) CLOUD SHADOW DETECTION: VNIR-SWIR

(75) Inventors: Arthur L Boright, Bonney Lake, WA (US); John C Sluder, Kent, WA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 10/845,385

(22) Filed: May 13, 2004

(65) Prior Publication Data

US 2005/0114027 A1 May 26, 2005

Related U.S. Application Data

(63) Continuation-in-part of application No. 10/815,144, filed on Mar. 31, 2001, now Pat. No. 7,058,511, which is a continuation-in-part of application No. 10/720,290, filed on Nov. 24, 2003, now Pat. No. 6,990,410.

(51) Int. Cl.
G01W 1/00 (2006.01)
G06F 19/00 (2006.01)

(52) U.S. Cl. .......................... 702/3; 73/170.16
(58) Field of Classification Search .......... 702/1–16; 73/170.16
See application file for complete search history.

(56) References Cited

U.S. PATENT DOCUMENTS

| | | | |
|---|---|---|---|
| 4,465,940 A | 8/1984 | Graff et al. | |
| 4,921,349 A | 5/1990 | Richards | |
| 5,075,856 A | 12/1991 | Kneizys et al. | |
| 5,088,833 A | 2/1992 | Tsang et al. | |
| 6,035,710 A * | 3/2000 | Hutchison et al. | 73/170.16 |
| 6,208,938 B1 * | 3/2001 | Doerfel | 702/3 |
| 6,531,701 B2 | 3/2003 | Chou et al. | |
| 6,697,065 B1 | 2/2004 | Furuhashi et al. | |
| 2005/0036661 A1 | 2/2005 | Viggh | |

OTHER PUBLICATIONS

Ackerman, S. A., et al., "Discriminating Clear Sky From Clouds With MODIS," Journal of Geophysical Research, Dec. 27, 1998, vol. 103, No. D24, pp. 32, 141-32,157.

Adler-Golden, S.M., et al., "An Algorithm for De-Shadowing Spectral Imagery," presented at the AVIRIS Earth Sciences and Applications Workshop, at the NASA Jet Propulsion Laboratory (2002).

(Continued)

Primary Examiner—John Barlow
Assistant Examiner—Victor J. Taylor
(74) Attorney, Agent, or Firm—Lee & Hayes, PLLC

(57) ABSTRACT

Systems, computer-readable media, and systems are provided for determining whether a data point indicates a presence of a shadow-covered ground point. A data point from top of atmosphere data from an imaging study of an area potentially covered by a cloud shadow is selected. At least one spectral data measurement associated with the data point, the spectral data measurement including at least one of visible, near-infrared, and short wavelength infrared data is taken. At least one of the spectral data measurement and derived spectral index is compared with a spectral data threshold, the spectral data threshold delineating between a shadow-covered ground point and a non-shadow-covered ground point. The data point is classified as one of a shadow-covered ground point and a non-shadow covered ground point based on the comparison with the spectral data threshold.

99 Claims, 16 Drawing Sheets

OTHER PUBLICATIONS

Boardman, J. W., 1993, "Automating Spectral Unmixing of AVIRIS Data Using Convex Geometry Concepts," in: Summaries of the Fourth Annual JPL Airborne Geoscience Workshop, Washington, D.C., v. 1.

Choi, K-Y., et al., "A Multispectral Transform for the Suppression of Cloud Shadows," presented at the Fourth International Airborne Remote Sensing Conf. and Exhibition/21st Canadian Symposium on Remote Sensing, Ottawa, Ontario, Canada, Jun. 11-14, 1999.

Diner, D. J., et al., "Earth Observing System Multi-angle Imaging Spectro-Radiometer (MISR) Level 1 Cloud Detection Algorithm Theoretical Basis," Jet Propulsion Laboratory, California Institute of Technology, Dec. 7, 1999, vol. D-13397, Rev. B, pp. 1-38.

Gao, B-C., et al., An Algorithm Using Visible and 1.38 -µm Channels to Retrieve Cirrus Cloud Reflectances from Aircraft and Satellite Data, IEEE Transactions on Geoscience and Remote Sensing, Aug. 2002, vol. 40, No. 8, pp. 1659-1668.

Gao, B-C., and Kaufman, Y. J., "Selection of the 1.375-µm MODIS Channel for Remote Sensing of Cirrus Clouds and Stratospheric Aerosols from Space," American Meteorological Society, Journal of the Atmosphere Sciences, Dec. 1, 1995, vol. 52, No. 23, pp. 4231-4237.

Gao, B-C., et al., "Correction of Thin Cirrus Path Radiances in the 0.4-1.0 µm Spectral Region Using the Sensitive 1.375 µm Cirrus Detecting Channel," J. Geophy. Research, Dec. 27, 1998, vol. 103, No. D24, pp. 32,169-32, 176.

Goodman, A. H. and Henderson-Sellers, A., "Cloud Detection and Analysis: A Review of Recent Progress," Atmospheric Research, 1988, vol. 21, Nos. 3-4, pp. 229-240.

Gwinner, K., et al., "A Case Study on the Influence of Shadows and Shading on Multispectral Airborne Imaging Data," presented at the Third International Airborne Remote Sensing Conf. and Exhibition, Jul. 7-10, 1997 Copenhagen, Denmark.

Irish, R.R., "Landsat 7 Automatic Cloud Cover Assessment, in Algorithms for Multispectral, Hyperspectral, and Ultraspectral Imagery VI," S. S. Chen, M. R. Descour, Editors, Proceedings of SPIE, 2000, vol. 4049, pp. 348-355.

King, M. D., et al., "Discriminating Heavy Aerosol, Clouds, and Fires During SCAR-B: Application of Airborne Multispectral MAS Data," J. Geophy. Research, Dec. 27, 1998, vol. 103, No. D24, pp. 31,989-31,999.

Lissens, Gil, "Development of a Cloud, Snow and Cloud Shadow Mask for VEGETATION Imagery," in *Proc. Vegetation 2000: 2 Years of Operation to Prepare the Future Workshop*, G. Saint, Ed., Apr. 3-6, 2000, pp. 303-306.

Logar, A., et al., "A Hybrid Historam/Neural Network Classifier for Creating Global Cloud Masks," International Journal of Remote Sensing, 1997, vol. 18, No. 4, pp. 847-869.

Logar, A. M., et al., The ASTER Polar Cloud Mask,: IEEE Transactions of Geoscience and Remote Sensing, Jul. 1998, vol. 36, No. 4, pp. 1302-1312.

Milton, E. J., et al., "Cloud Shadow Suppression Using a Feature Space Approach to the Identification of Virtual Endmembers," Proceedings of 25th Annual Conference and Exhibition of the Remote Sensing Society, Cardiff, UK (1999).

Rossow, W. B., et al., "Global, Seasonal Cloud Variations from Satellite Radiance Measurements. Part I: Sensitivity of Analysis," Journal of Climate, May 1989, vol. 2, pp. 419-460.

Rossow, W. B., et al., "ISCCP Cloud Algorithm Intercomparison," Journal of Climate and Applied Meteorology, Sep. 1985, vol. 24, No. 9, pp. 877-903.

Rossow, W. B., "Measuring Cloud Properties from Space: A Review," Journal of Climate, Mar. 1989, vol. 2, pp. 201-215.

Sèze, G., et al., "Cloud Cover Observed Simultaneously from POLDER and METEOSAT," Physics and Chemistry of the Earth Part B: Hydrology, Oceans and Atmosphere, 1999, vol. 24, No. 8, pp. 921-926.

Simpson, J. J., et al., "A Procedure for the Detection and Removal of Cloud Shadow from AVHRR Data Over Land," IEEE Transactions on Geoscience and Remote Sensing, vol. 36, No. 3, pp. 880-897, May 1998.

Simpson, J. J., et al., "Cloud Shadow Detection Under Arbitrary Viewing and Illumination Conditions," IEE Transactions on Geoscience and Remote Sensing, Mar. 2000, vol. 38, No. 2, pp. 972-976.

Varlyguin, D. L., et al.,. Advances in Land Cover Classification for Applications Research: A Case Study from The Mid-Atlantic RESAC. Available at www.geog.umd.edu/resac and on ASPRS-2001 CD-ROM in American Society for Photogrammetry and Remote Sensing (ASPRS) Conference Proceedings, Washington DC (2001).

Vermote, E. F., et al., "A SeaWiFS Global Monthly Coarse-Resolution Reflectance Dataset," International Journal of Remote Sensing, 2001, vol. 22, No. 6, pp. 1151-1158.

Wang, B., et al., "Automated Detection and Removal of Clouds and their Shadows from Landsat TM Images," IEICE Trans., Inf & Syst., vol. E82-D, No. 2, Feb. 1999.

* cited by examiner

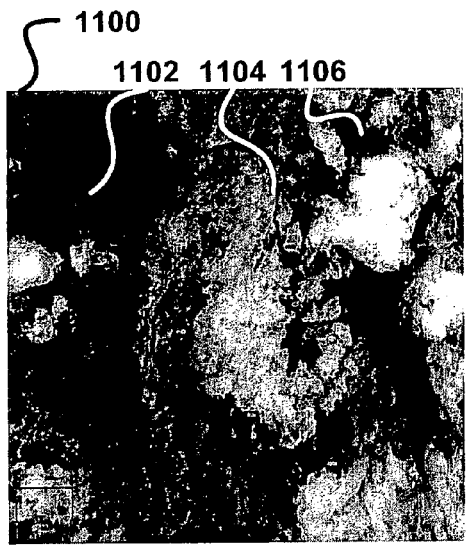
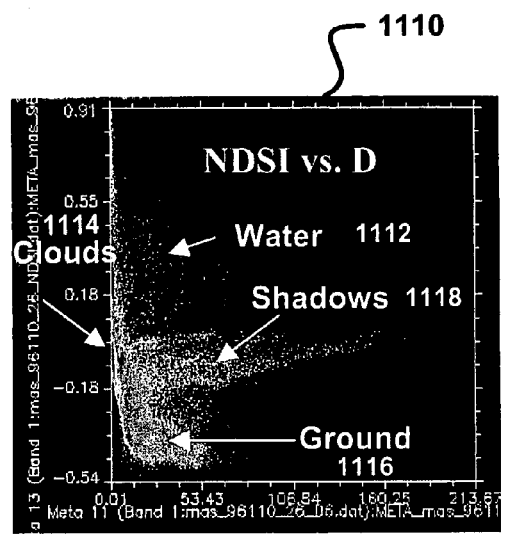
Fig. 11A  Fig. 11B
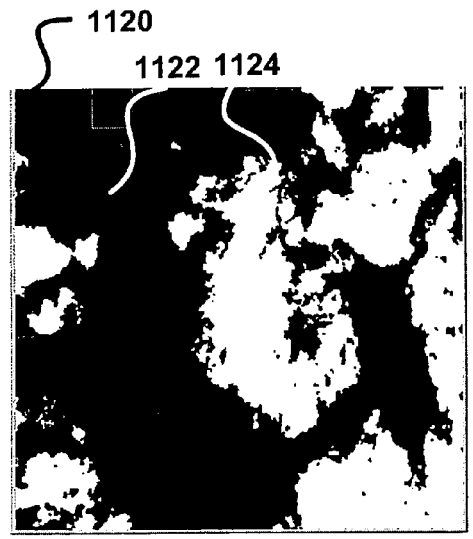
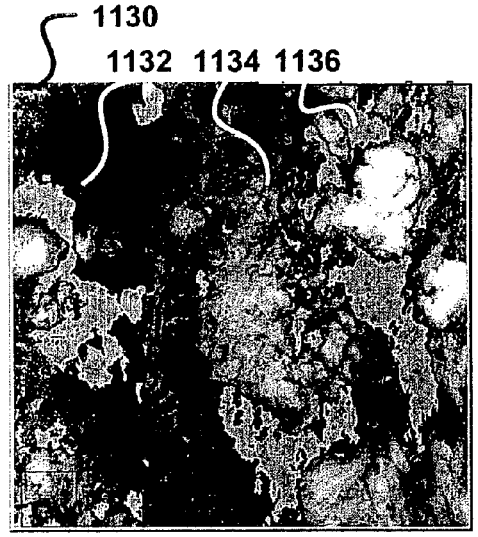
Fig. 11C  Fig. 11D

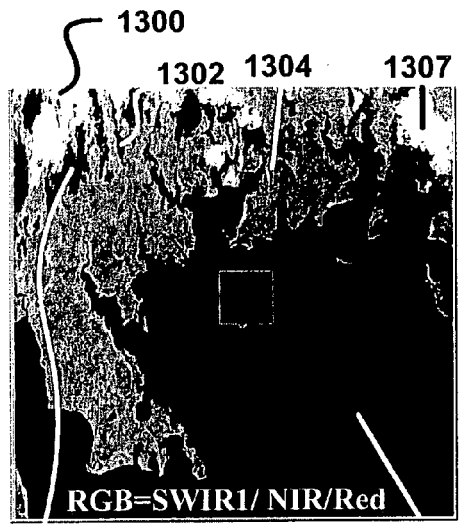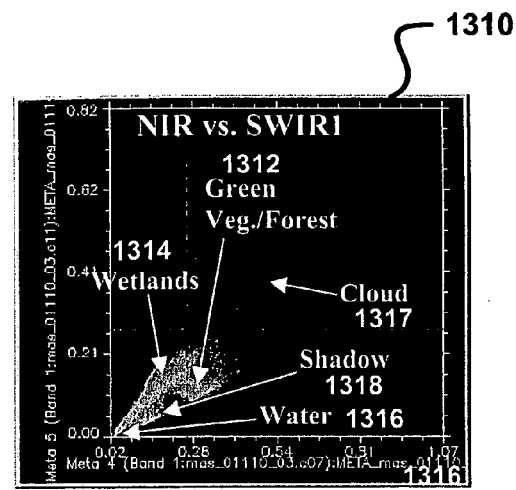
Fig. 13A     Fig. 13B
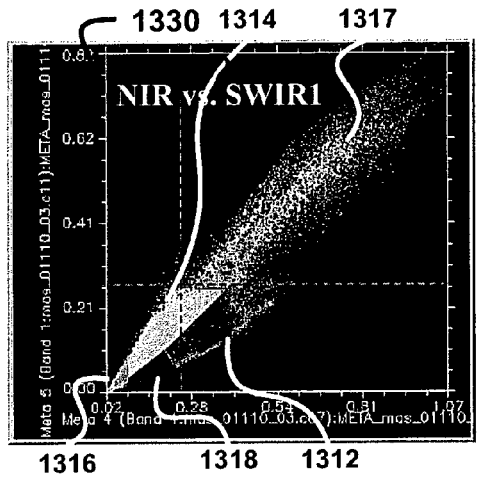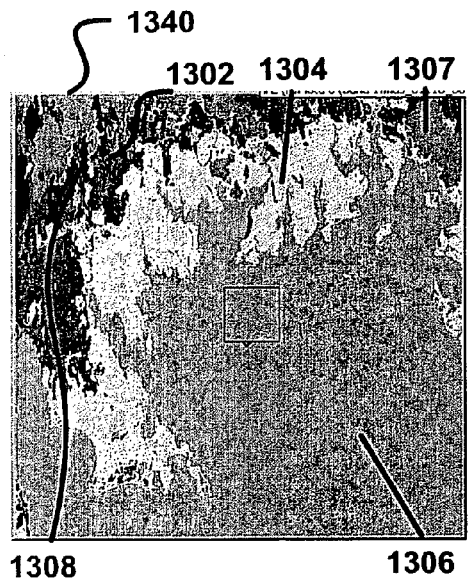
Fig. 13C     Fig. 13D

CLOUD SHADOW DETECTION: VNIR-SWIR

RELATED CASE

This application constitutes a continuation-in-part of the commonly-owned U.S. patent application Ser. No. 10/815,144 entitled "SUB-VISIBLE CLOUD COVER ASSESSMENT: VNIR-SWIR," filed on Mar. 31, 2004 now U.S. Pat. No. 7,058,511, which is a continuation in part of commonly-owned U.S. patent application Ser. No. 10/720,290 entitled "CLOUD COVER ASSESSMENT: VNIR-SWIR," filed on Nov. 24, 2003 now U.S. Pat. No. 6,990,410, which applications are hereby incorporated by reference.

FIELD OF THE INVENTION

This invention relates generally to image processing and, more specifically, to detection of cloud cover in high-altitude and/or orbital overhead imaging data.

BACKGROUND OF THE INVENTION

Overhead imaging studies of a surface below may be hampered by the presence of cloud formations. Understandably, thick clouds between an observation point and the area of interest under observation can conceal objects or features in the area of interest. Potentially worse in some cases is the presence of thinner cloud formations that do not entirely occlude the surface, but may reduce the contrast of surface features and change the derived surface spectral reflectance signature with resulting impact on information products such as spectral vegetation indices. Presence of thin cloud formations, such as cirrus clouds, can skew the analysis of such surface features by causing researchers to confuse presence of cloud features for features or changes in the surface region of study. For example, FIG. 1A shows a representative image 100 of a surface area under study. Merely looking at the image, it may be difficult to determine which aspects of the image are surface features 110 and which aspects are cloud features 120. Further, even though not visible to the naked eye observing an image, or to the eye of a person examining such an image, even sub-visible cloud formations can significantly degrade quantitative spectral analyses of an area being imaged.

Because the presence of cloud formations can interfere with the accuracy of overhead imaging studies, methodologies have been developed to detect the presence of cloud formations so that accuracy of surface studies will not be undermined by undetected cloud patterns. One approach is to use "clear-sky" spectral or reflectance maps of the areas of interest to detect the presence of clouds. By comparing the clear-sky maps with current imaging data, large-area spectral or reflectance changes may signal the presence of cloud cover. This approach involves successfully collecting, verified clear-sky imaging data of the area of interest. The clear-sky maps typically are created using thermal infra-red measurements to determine the presence of cloud formations. Most cloud formations, including high altitude such as cirrus clouds made up of ice crystals present a distinct, differentiable thermal signature. If thermal data indicates the presence of cirrus or other clouds in an area of study, it will be understood which portions of the image data are affected by the presence of clouds. Thus, analysis of the area of interest will not be distorted by the presence of undetected cloud formations.

FIG. 1B shows a "cloud mask" 150 derived using conventional techniques to show the cloud features 120 in the original image 100 of FIG. 1A. Absent the cloud mask 150, it can be appreciated that it might have been easy to confuse edges of cloud patterns 120 with surface features 110.

Unfortunately, as is readily appreciated, collection of thermal-infra red data requires equipment capable of gathering thermal-infrared data. In the realm of orbital satellites, integrating such equipment into the satellite increases cost. Additional telemetry involved in making use of such data also is resource-intensive and costly.

Even where such clear-sky data are available, continual accurate analytical comparison of archival clear-sky data with currently-captured imaging data is needed to ensure that the captured data represents suitably accurate, cloud-free images. Determination of whether the imaging data is suitably cloud-free is a significant concern. If it is not accurately determined whether captured images are suitably cloud-free, it may be necessary to arrange for the areas of interest to be re-imaged. Analysts who desire to use images from an image archive need to be assured that the image data is sufficiently cloud-free to be worthy of acquisition and use in their research. In addition, before quantitative analysis tools are applied to analyze the imaging data, the imaging data must be determined to be suitably cloud-free to ensure that the resulting quantitative analyses will be correct. Alternatively, algorithms may be applied to correct for thin cirrus cloud effects over portions of images affected only (no visible lower cloud) by thin cirrus cloud of reflectance below some arbitrary threshold.

Beyond differentiating terrain covered by clouds, a further challenge in evaluating spectral or reflectance data is to identify shadowed terrain. Shadow-covered terrain may not be easily differentiated from bodies of water, vegetation-covered areas having a naturally dark color, surfaces darkened by rain or surface water, and other areas presenting a relatively lower reflectance. Shadow-covered terrain potentially could corrupt results of an imaging study just as presence of undetected cloud cover could corrupt an imaging study. Performing such differentiation automatically, without involving excessive computing resources is highly desirable. Existing techniques involve computing intensive techniques using neural networks, image fusion, spectral end member analyses and transforms, radiance spatial gradient and continuity analyses, and other resource-intensive processes. Moreover, even such resource-intensive processes may involve significant human expert involvement in "teaching" the system to differentiate between shadowed ground, wet ground, wetlands, or other similar features.

Thus, there is an unmet need in the art for a method for determining presence of clouds and sub-visible clouds in aerial imaging data not involving use of special thermal infrared sensing equipment or the data collected by such equipment.

SUMMARY OF THE INVENTION

Embodiments of the present invention are useful in determining the presence of shadows in imaging data. Embodiments of the present invention use spectral tests applied to pixel-level spectral measurements to determine the presence of shadows. The tests are computationally simple and, thus, do not impose an unreasonable operational computing workload. A sequence of such tests may be successively applied to the pixel-level spectral measurements to classify the pixel as indicating presence or absence of a shadow. Embodiments of the present invention can be used with various forms of visible and sub-visible cloud assessment to detect presence of cloud formations as well as shadows.

More particularly, embodiments of the present invention provide methods, computer-readable media, and systems for determining whether a data point indicates a presence of a shadow using visible, near-infrared, and short wavelength infrared data. A data point from top of atmosphere data from an imaging study of an area potentially covered by a cloud shadow is selected. At least one spectral data measurement associated with the data point, the spectral data measurement including at least one of visible, near-infrared, and short wavelength infrared data is taken. The spectral data measurement or derived spectral index is compared with a spectral data threshold, the spectral data threshold delineating between a shadow-covered ground point and a non-shadow-covered ground point. The data point is classified as one of a shadow-covered ground point and a non-shadow covered ground based on the comparison with the spectral data threshold.

Embodiments of the present invention can be combined with visible and/or sub-visible cloud detection systems and methods, advantageously preventing otherwise undetected visible clouds, sub-visible clouds, and shadows from corrupting data gathered in an imaging study. Embodiments of the present invention can be combined with systems and methods for detecting visible clouds and sub-visible clouds using visible, near-infrared, and short wavelength infrared data. Embodiments of the present invention also can be combined with systems and methods for detecting visible clouds and sub-visible clouds using thermal imaging.

BRIEF DESCRIPTION OF THE DRAWINGS

The preferred and alternative embodiments of the present invention are described in detail below with reference to the following drawings.

FIG. 11A is an aerial image of an exemplary region of interest showing clouds, ground, and shadows;

FIG. 11B is a graph plotting spectral measurements differentiating regions of clouds, water, shadows, and ground;

FIG. 11C is a cloud mask derived from spectral measurements;

FIG. 11D is a shadow mask superimposed on the aerial image of FIG. 11A;

FIG. 13A is an aerial image of an exemplary region of interest showing wetlands, vegetation, clouds, and shadows;

FIG. 13B is a graph plotting spectral measurements differentiating regions of wetlands, vegetation, clouds, and shadows;

FIG. 13C is a graph plotting spectral measurements differentiated to clarify regions of wetlands, vegetation, clouds, and shadows;

FIG. 13D is a composite mask showing regions of wetlands, vegetation, clouds and shadows superimposed on the aerial image of FIG. 13A;

DETAILED DESCRIPTION OF THE INVENTION

The invention relates generally to image processing and, more specifically, to detection of shadows in high-altitude and/or orbital overhead imaging data. Many specific details of certain embodiments of the invention are set forth in the following description and in FIGS. 1–16 to provide a thorough understanding of such embodiments. One skilled in the art, however, will understand that the present invention may have additional embodiments, or that the present invention may be practiced without several of the details described in the following description.

Embodiments of the present invention can be used to determine the presence of shadows in imaging data. Embodiments of the present invention can detect shadows with spectral tests applied to pixel-level spectral measurements to determine the presence of shadows using spectral data. Shadow detection using embodiments of the present invention can be combined with other processes to detect presence of visible and sub-visible clouds, whether or not those processes employ thermal imaging.

By way of overview, embodiments of the present invention provide methods, computer-readable media, and systems for determining whether a data point indicates a presence of a shadow using visible, near-infrared, and short wavelength infrared data. A data point from top of atmosphere data from an imaging study of an area potentially covered by a cloud shadow is selected. At least one spectral data measurement associated with the data point, the spectral data measurement including at least one of visible, near-infrared, and short wavelength infrared data is taken. The spectral data measurement or derived spectral index is compared with a spectral data threshold, the spectral data threshold delineating between a shadow-covered ground point and a non-shadow-covered ground point. The data point is classified as one of a shadow-covered ground point and a non-shadow covered ground based on the comparison with the spectral data threshold.

Studying images, empirically it can be determined for each of these data points whether the data point signifies a cloud point or a non-cloud point. It will be appreciated that, in accordance with embodiments of the present invention, a number of derived quantities and spectral indices can be calculated for each data point using data extractable from visible, near-infrared, and short-wavelength infrared data. By studying these derived quantities or indices, threshold values are determinable by which they suitably are used to automatically determine whether a data point represents a cloud point or a non-cloud point. It will also be appreciated that, although embodiments of the present invention may analyze data to determine a presence of both visible clouds and sub-visible cloud layers, a presently preferred embodiment of the present invention is tailored to classifying data points based on whether the data points indicate the presence of cloud shadows.

Figure 1A:
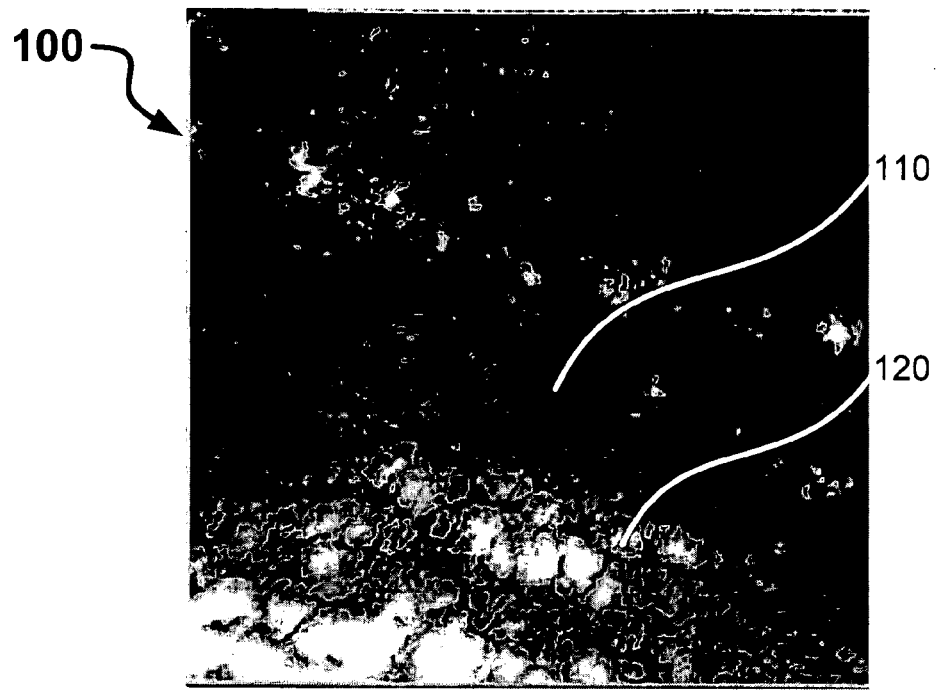
FIG. 1A is a conventional aerial image of an exemplary region of interest in accordance with the prior art.
Figure 1B:
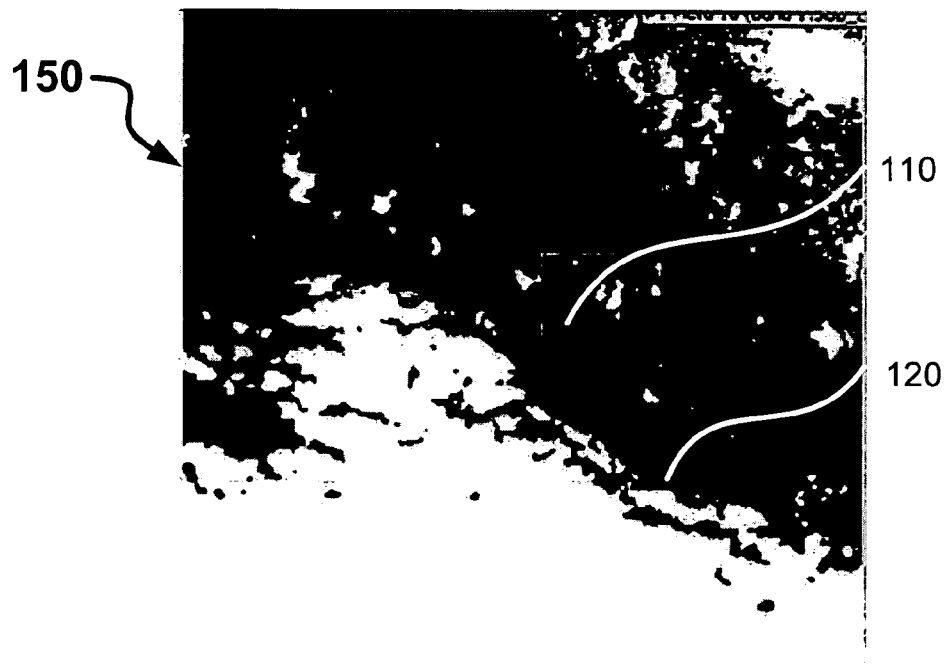
FIG. 1B is a conventional cloud mask derived from conventional techniques to indicate the presence of clouds in the image of the exemplary region of interest in accordance with the prior art.
Figure 2:
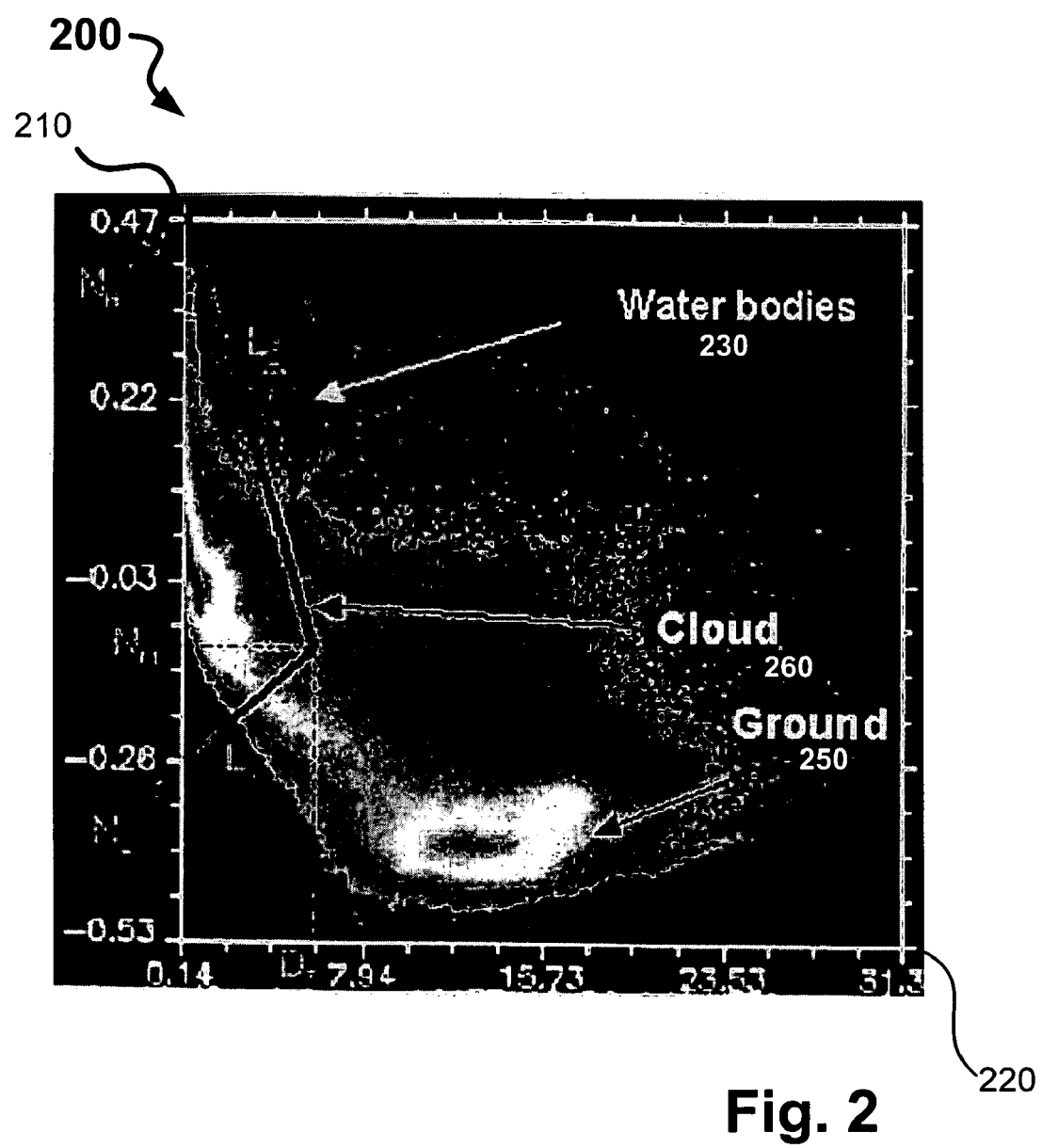
FIG. 2 is a graph plotting NDSI values versus D values and illustrating points where clouds are present.

FIG. 2 shows an exemplary graph 200 of such calculated quantities. Examining such a graph or other data representation in conjunction with associated cloud masks and RGB image, it can be determined what data points should be classified as cloud points and which should be classified as non-cloud points. More specifically, the graph shows normalized difference snow index, NDSI, plotted on a vertical axis 210 against values of a D variable on the horizontal axis 220. In one embodiment, NDSI is determined by equation (1):

$$NDSI = (\rho_{Green} - \rho_{SWIR1})/(\rho_{Green} + \rho_{SWIR1}) \quad (1)$$

The reflectance values, $\rho_{Green}$ and $\rho_{SWIR1}$, represent reflectance in the selected wavelength range, such as the green wavelengths, the short-wave infrared wavelength, respectively. The D variable, in turn, is determined from a normalized difference vegetation index, NDVI, respectively determined from equations (2) and (3):

$$D = |NDVI|^{0.6}/(\rho_{Red})^2 \quad (2)$$

$$NDVI = (\rho_{NIR} - \rho_{Red})/(\rho_{NIR} + \rho_{Red}) \quad (3)$$

The reflectance values, $\rho_{Red}$ and $\rho_{NIR}$, represent reflectance in the selected wavelength range, such as the red wavelengths, the near-infrared wavelengths, respectively.

The graph 200 shows values of NDSI versus D for data points that have been empirically identified by manual, visual inspection of an area of interest as representing bodies of water 230, shadows 240, ground 250, and clouds 260. Thus, because the data used in deriving NDSI, D, and NDVI is derivable from visible/near-infrared and short-wavelength infrared data, data points representing cloud points and non-cloud points can be identified without separate thermal infrared data.

A comparable analysis is achievable using different formulations of D. For example, in analyzing data collected by the Multiangle Imaging SpectroRadiometer (MISR) sensor used by NASA, D is calculated by raising NDVI to different exponential values depending on a type of ground cover expected to be present in the surface being imaged. Although the MISR D use is more complex because of its landcover-type-dependent NDVI exponent and large, statistically derived, D-threshold database, MISR D values also can be used with embodiments of the present invention to achieve satisfactory results.

Embodiments of the present invention can employ a number of such quantities to classify data points as cloud points or non-cloud points. Selection, ordering, calculation, and comparison of such quantities can be made in order to balance computational burdens and desired classification precision. For example, in two exemplary embodiments described below, a first comparison involves reflectance in the cirrus-band wavelengths, $\rho_{CI}$, with a threshold value which provides a ready, reliable first step in classifying data points as either cloud points or non-cloud points. In contrast with NDSI or D, $\rho_{CI}$ can be compared to a threshold value without additional computation, thus making a comparison of $\rho_{CI}$ as a first step can reduce computational burdens. It will also be appreciated that the steps can be ordered to evaluate potentially more reliable classifiers first, or the steps can be ordered to provide a logical AND or OR construct to provide for reliable classification of the data points.

Depending upon the computational resources available, it will be appreciated that analysis of data points can occur in real-time, while analysis of classification precision vs. computing load may occur in non-real-time. If non-real-time analyses indicate that greater precision can be achieved, to better meet user needs within available computing resources, by adjusting thresholds or adding additional cited tests to the real-time test hierarchy for specific background landcover types, locations, or times of year, those revisions can be made for future real-time processing.

Figure 3:
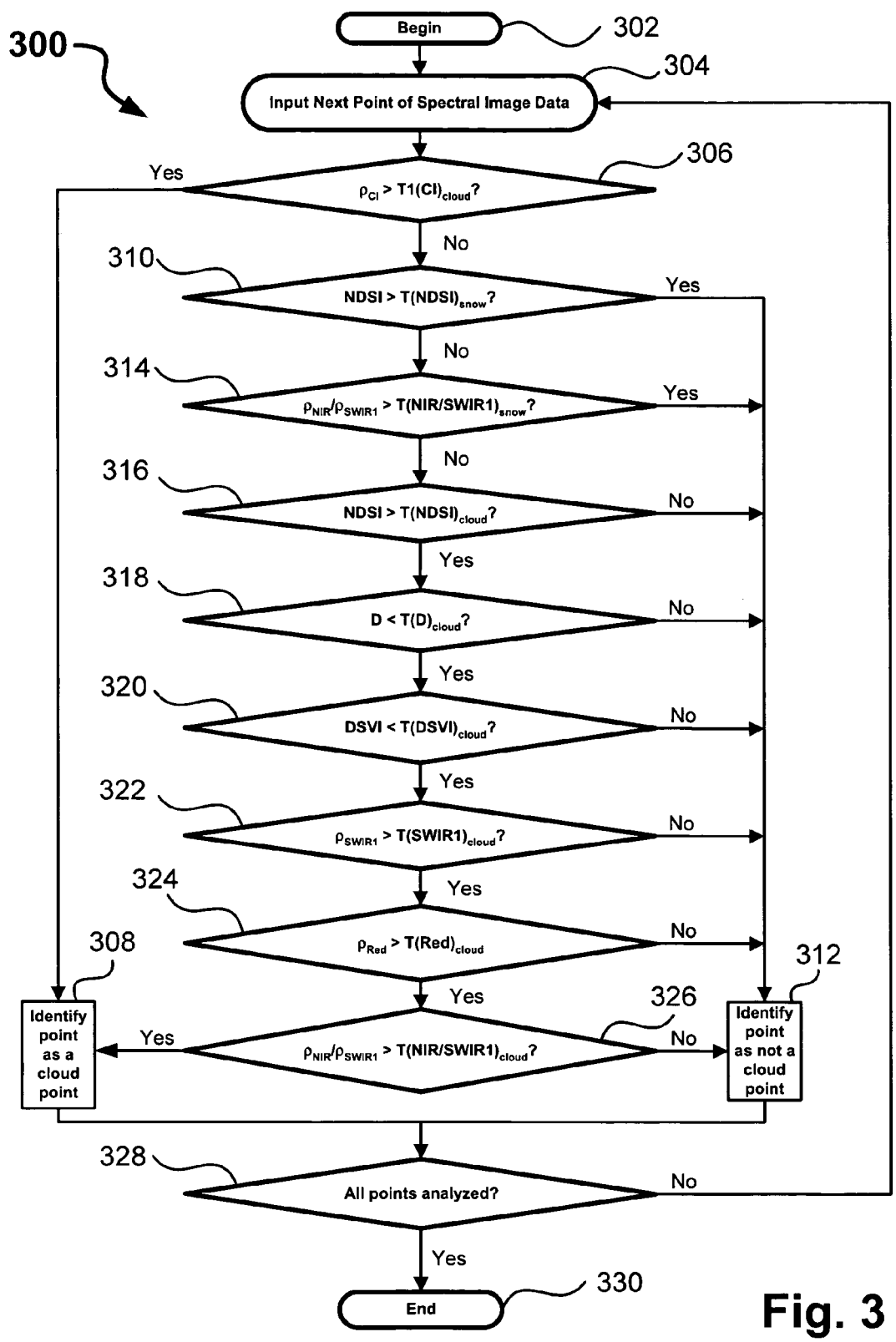
FIG. 3 is a flowchart of a routine according to an embodiment of the present invention for determining presence of cloud formations.

FIG. 3 shows a first embodiment of a routine 300 for classifying data points as cloud points or non-cloud points. The routine 300 begins at a block 302, and a next point of top of atmosphere, visible, near-infrared, and short-wavelength infrared data is submitted for processing at a block 304. At a block 306, a comparison of the $\rho_{CI}$ to a cirrus-band threshold cloud value is made. If $\rho_{CI}$ exceeds the threshold value, the data point is classified as a cloud point at a block 308. If not, the routine 300 proceeds to a next block to make a further comparison of whether the data point represents a cloud point or a non-cloud point.

In one particular embodiment, the $\rho_{CI}$ comparison at the block 306 is made at a wavelength of 1.88 µm. At this wavelength, the reflectance has been determined to be more reliable than at slightly lower wavelengths. Of course, in alternate embodiments, $\rho_{CI}$ may be tested at wavelengths other than 1.88 µm, such as at 1.38 µm or other cirrus bands.

If the comparison of $\rho_{CI}$ at the block 306 to make an initial determination of whether the data point was a cloud point did not result in the data point being classified as a cloud point at the block 308, additional comparisons can be made to further differentiate whether the data point is a cloud point or a non-cloud point. The comparisons and number of comparisons selected suitably are chosen to balance between computational simplicity and classification precision. Generally, up to some point of optimal performance, as a greater number of comparisons are performed, greater precision is obtained. Nonetheless, selecting a fewer number of comparisons may result in a desirable degree of accuracy with fewer comparisons and/or calculations being made.

More specifically, if the comparison of the data point at the block 306 does not result in the data point being identified as a cloud point at the block 308, at a block 310 the NDSI is compared to an NDSI snow threshold value. This comparison may eliminate data points showing snow. If the data point NDSI is greater than the NDSI snow threshold value, the data point is a snow point. Again, the NDSI threshold value may be empirically determined using other information from which data points have previously been classified as cloud points or non-cloud points. If at the block 310 the NDSI exceeds the NDSI snow threshold value, the data point is classified as a non-cloud point at the block 312.

It will be appreciated how threshold values like the NDSI snow threshold value compared at the block 310 can affect classification precision. If, for example, the NDSI snow threshold is lowered, more data points may be classified as non-cloud, snow background ground points. If analysis reveals that this revision results in a net improvement in classification accuracy, application of further comparisons in the routine 300 may be avoided. Adjusting the thresholds in the tests described will determine how the individual data points in thinly cloud covered areas are classified. Accordingly, selection of thresholds based on empirical analysis of tested values for test data points known to be cloud points or non-cloud points over specific categories of landcover, location and season will incorporate a predetermined classification accuracy into embodiments of the present invention.

If the comparison of the data point at the block 310 does not result in the data point being identified as a non-cloud point at the block 312, then at a block 314, a comparison of a ratio of the near infrared reflectance data to the short-wavelength infrared reflectance data, NIR/SWIR1, to a NIR/SWIR1 reflectance ratio snow threshold value is made to potentially eliminate data points showing snow. If the NIR/SWIR1 reflectance ratio value exceeds the NIR/SWIR1 reflectance ratio snow threshold value, the data point is classified as a non-cloud point at the block 312.

If the comparison of the data point at the block 314 does not result in the data point being identified as a non-cloud point at the block 312, then at a block 316 a comparison of a ratio of the NDSI value to an NDSI cloud threshold value is made to potentially eliminate data points showing bright ground. If the NDSI value is less than the NDSI cloud threshold value, the data point is classified as a non-cloud point at the block 312.

If the comparison of the data point at the block 316 does not result in the data point being identified as a non-cloud point at the block 312, at a block 318 a comparison of the D variable is made with a D variable cloud threshold to potentially eliminate data points showing vegetation. If the D variable is greater than the D variable cloud threshold, the data point is classified as a non-cloud point at the block 312.

If the comparison of the data point at the block 318 does not result in the data point being identified as a non-cloud point at the block 312, then at a block 320 a comparison of a D spatial variability index, DSVI, is made with a DSVI cloud threshold to potentially eliminate data points showing non-smooth features. In one particular embodiment, the D spatial variability index may be given by:

$$DSVI=|D_m-D_c| \quad (4)$$

$D_m$ is mean of D values for at least a three-by-three matrix of data points surrounding the data point and $D_c$ is a central pixel in the three-by-three matrix of data points. If the DSVI is greater than the DSVI cloud threshold value, the data point is classified as a non-cloud point at the block 312.

It will be appreciated that calculation of the DSVI is a more computationally intensive step than other steps previously undertaken. The DSVI is derived from a plurality of D values which, in turn, are calculated from reflectance data of the data point. It will be appreciated that this step is not a first step in the routine 300 allowing for the possibility of faster, less-intensive methods associated with the foregoing blocks allowing for the data point to be classified as a cloud point 308 or a non-cloud point at the block 312. On the other hand, should additional computing power be available, the $D_m$ portion of DSVI could be computed for a larger matrix of points such as a mean of a five-by-five or larger matrix, centered on $D_c$. Use of a larger matrix can increase the accuracy of the DSVI comparison by providing a statistically better $D_m$ portion. If the comparison of the data point at the block 320 does not result in the data point being identified as a non-cloud point at the block 312, then at a block 322 a comparison of the short-wavelength infrared reflectance, $\rho_{SWIR1}$, is made to a short-wavelength infrared reflectance cloud threshold to potentially eliminate data points showing dark features. If $P_{SWIR1}$ is less than the short-wavelength infrared reflectance cloud threshold, the data point is classified as a non-cloud point at the block 312.

If the comparison of the data point at the block 322 does not result in the data point being identified as a non-cloud point at the block 312, then at a block 324 a comparison of $\rho_{Red}$ to a red wavelength cloud threshold reflectance value is made to eliminate additional data points showing dark features. If $\rho_{Red}$ is less than the red wavelength cloud threshold reflectance value, the data point is classified as a non-cloud point at the block 312.

If the comparison of the data point at the block 324 does not result in the data point being identified as a non-cloud point at the block 312, then at a block 326, a comparison of a ratio of the NIR/SWIR1 reflectance ratio to a NIR/SWIR1 cloud threshold reflectance ratio value is made to potentially eliminate additional data points showing bright ground. If the NIR/SWIR1 reflectance ratio value is less than the NIR/SWIR1 cloud threshold reflectance ratio value the data point is classified as a non-cloud point at the block 312. On the other hand, if the NIR/SWIR1 reflectance ratio value is greater than the NIR/SWIR1 cloud threshold reflectance ratio value, the data point is classified as a cloud point at the block 308.

Once the data points have been classified as one of a cloud point at the block 308, or as a non-cloud point at the block 312, then at a block 328 it is determined if all data points of interest have been classified. If not, the routine 300 loops to the block 304 where the next data point is addressed. However, if it is determined at the block 328 that all the data points of interest have been analyzed, the routine 300 ends at the block 330.

As previously described, the routine 300 uses cloud thresholds empirically derived from manual or other studies of overhead imaging data. The threshold values may vary depending on the nature of the area of interest and the season during which the imaging data is captured. For example, threshold values for forests or closed shrub areas will vary between summer/tropical seasons and snowy seasons, just as the threshold values will vary between permanent wetlands and permanently snow-covered areas. For example, and not by way of limitation, Table 1 presented below lists representative threshold values that suitably may be used in the routine 300 for scenes and seasons of interest:

TABLE 1

| Scene | Season | D | $NDSI_{snow}$ | $NDSI_{cloud}$ | DSVI | $\rho_{SWIR1}$ | $NIR/SWIR1_{snow}$ | $NIR/SWIR1_{cloud}$ | $\rho_{Red}$ | $P_{Cloud}$ |
|---|---|---|---|---|---|---|---|---|---|---|
| Forest/Closed Shrub | Summer or Tropical | 20 | N/A | −0.25 | 1 | 0.1 | N/A | 1 | 0.1 | 0.03 |
| Forest/Closed Shrub | Spring or Fall without snow | 10 | N/A | −0.35 | 3.5 | 0.1 | N/A | 1 | 0.1 | 0.03 |
| Forest/Closed Shrub | Fall, Spring or Winter (snow) | 2 | 0.55 | −0.3 | 0.2 | 0..2 | 4 | N/A | 0.1 | 0.03 |
| Grass or Crops (Mosaic) | Summer | 20 (40) | N/A | −0.3 | 1 | 0.1 | N/A | 1 | 0.1 | 0.03 |
| Grass or Crops (Mosaic) | Spring or Fall w/o snow | 10 | N/A | −0.35 | 1 | 0.1 | N/A | 0.9 | 0.1 | 0.03 |
| | Fall, Spring or Winter w/snow | 2 | 0.55 | −0.35 | 0.2 | 0.2 | 4 | 1 | 0.2 | 0.03 |
| Snow and Ice | All | 2 | 0.55 | −0.3 | 0.2 | 0.2 | 4 | N/A | 0.1 | 0.03 |
| Barren or Sparse Open Shrub | (No Snow) | 4 | N/A | −0.25 | 1 | 0.1 | N/A | 0.8 | 0.2 | 0.03 |
| Savanna | (No Snow) | 10 | N/A | −0.35 | 1 | 0.1 | N/A | 0.8 | 0.2 | 0.03 |

It will be appreciated that thresholds can be derived from study of other scenes and terrains, such as wetlands or water-covered areas as well.

Various combinations of tests can be used to optimally balance desires for accuracy and computing efficiency. For example, accurate results are obtainable according to a subset of the routine 300 (FIG. 3) where comparisons are made at the decision blocks 306, 316, 318, 320, and 326 and at least one of the comparisons at the decision blocks 310, 314, and 322. Table 2, on a next page, shows a computed accuracy for tests and combinations of tests run on a number of data sets.

TABLE 2

| Scene# | MAS ID | Truth % | Cirrus % | Error = Measured − Truth | | | | | | |
|---|---|---|---|---|---|---|---|---|---|---|
| 1 | 97047_21 | 51.33 | 43.1735 | 1.8217 | 1.8217 | 4.3696 | 4.3696 | 1.1733 | 1.1733 | 4.1394 |
| 2 | 97050_09 | 26.75 | 18.6906 | −3.0505 | −3.0505 | −4.0335 | −4.0335 | −4.6833 | −4.6833 | −4.1657 |
| 3 | 96110_26 | 61.36 | 60.1988 | −1.1286 | −1.1286 | −0.7469 | −0.7470 | −1.1433 | −1.1433 | −0.8238 |
| 4 | 96114_10 | 55.95 | 54.3096 | −1.2736 | −1.2736 | −1.2696 | −1.2696 | −1.2736 | −1.2736 | −1.2696 |
| 5 | 95116_02 | 78.66 | 78.0950 | −0.1030 | −0.1030 | 0.6430 | 0.6402 | −0.1030 | −0.1030 | 0.3881 |
| 6 | 01100_01 | 34.05 | 16.9678 | −6.2901 | −6.3132 | −6.2899 | −6.3129 | −6.2901 | −6.3132 | −6.2899 |
| 7 | 01100_02 | 60.58 | 53.1903 | −7.2377 | −7.2378 | −7.2377 | −7.2378 | −7.2377 | −7.2378 | −7.2377 |
| 8 | 01100_03 | 33.17 | 30.2151 | 0.0958 | 0.0958 | 0.1899 | 0.1895 | 0.0958 | 0.0958 | 0.1899 |
| 9 | 01100_04 | 0.64 | 0.3803 | −0.0373 | −0.0373 | −0.0359 | −0.0363 | −0.0373 | −0.0373 | −0.0359 |
| 10 | 01100_06 | 9.17 | 0.0000 | −5.1183 | −5.1187 | −4.9469 | −4.9782 | −5.1183 | −5.1187 | −4.9469 |
| 11 | 01100_07 | 22.36 | 1.7270 | 1.0630 | 1.0607 | 1.9494 | 1.9105 | 1.0630 | 1.0607 | 1.9494 |
| 12 | 01100_08 | 95.09 | 94.6252 | −0.0941 | −0.0941 | −0.0924 | −0.0936 | −0.0941 | −0.0941 | −0.0924 |
| 13 | 01100_09 | 26.26 | 0.7833 | −6.2423 | −6.2423 | −5.7884 | −5.7930 | −6.2423 | −6.2423 | −5.7884 |
| 14 | 01100_10 | 17.97 | 0.2624 | −4.2455 | −4.2455 | −4.0007 | −4.0012 | −4.2455 | −4.2455 | −4.0007 |
| 15 | 01110_03 | 2.01 | 0.0000 | −0.8531 | −0.8532 | −0.8256 | −0.8333 | −0.8531 | −0.8532 | −0.8256 |
| 16 | 01110_04 | 51.42 | 26.9409 | −1.9426 | −1.9426 | −1.7426 | −1.7426 | −1.9426 | −1.9426 | −1.7426 |
| 17 | 01110_05 | 84.58 | 81.2260 | 3.2395 | 3.2395 | 3.2444 | 3.2415 | 3.2395 | 3.2395 | 3.2444 |
| 18 | 01110_08 | 40.21 | 29.2289 | −1.6000 | −1.6001 | −1.2898 | −1.5814 | −1.6000 | −1.6001 | −1.2898 |
| 19 | 01110_11 | 57.00 | 48.7074 | −8.1113 | −8.1113 | −7.7620 | −7.7821 | −8.1113 | −8.1113 | −7.7620 |
| 20 | 01110_12 | 30.91 | 24.0226 | −6.2068 | −6.2068 | −6.1620 | −6.1817 | −6.2068 | −6.2068 | −6.1620 |
| 21 | 01110_13 | 48.18 | 45.0783 | −2.4732 | −2.4732 | −2.4102 | −2.4473 | −2.4732 | −2.4732 | −2.4102 |
| 22 | 01110_14 | 34.98 | 31.1644 | −2.4859 | −2.4859 | −2.4699 | −2.4703 | −2.4859 | −2.4859 | −2.4699 |
| 23 | 01110_15 | 79.84 | 77.3877 | 0.7629 | 0.7627 | 0.9420 | 0.9417 | 0.7629 | 0.7627 | 0.9420 |
| 24 | 01130_05 | 71.09 | 52.6079 | 0.0370 | 0.0370 | 0.0370 | 0.0370 | 0.0370 | 0.0370 | 0.0370 |
| 25 | 01130_07 | 62.95 | 48.5385 | 2.4181 | 2.4177 | 2.5489 | 2.5476 | 2.4181 | 2.4177 | 2.5489 |
| 26 | 01130_09 | 28.74 | 0.0002 | −0.4654 | −0.4654 | 0.4605 | 0.2763 | −0.4654 | −0.4654 | 0.4605 |
| 27 | 99030_01 | 52.68 | 23.1581 | −3.2878 | −3.2878 | −1.8294 | −1.8294 | −3.2878 | −3.2878 | −1.8294 |
| 28 | 95163_17 | 48.89 | 9.3589 | −1.2679 | −1.2679 | −0.5307 | −0.5307 | −1.2679 | −1.2679 | −0.5307 |

TABLE 2-continued

| | | | | | | | | | | |
|---|---|---|---|---|---|---|---|---|---|---|
| 29 | 00176_05 | 50.89 | 0.0000 | 9.2824 | 4.9030 | 9.2826 | 4.9030 | 9.2824 | 4.9030 | 9.2826 |
| 30 | 00177_08 | 39.08 | 17.4549 | 2.2787 | −1.6414 | 2.2878 | −1.6414 | 2.2787 | −1.6414 | 2.2878 |
| | | Test# | 3 | 0 | 0 | 0 | 0 | 0 | 0 | 1 |
| | | | 4 | 0 | 0 | 1 | 1 | 1 | 1 | 0 |
| | | | 5 | 1 | 1 | 1 | 1 | 1 | 1 | 1 |
| | | | 6 | 1 | 1 | 1 | 1 | 1 | 1 | 1 |
| | | | 7 | 1 | 1 | 1 | 1 | 1 | 1 | 1 |
| | | | 8 | 1 | 1 | 0 | 0 | 1 | 1 | 0 |
| | | | 9 | 0 | 1 | 0 | 1 | 0 | 1 | 0 |
| | | | 10 | 1 | 1 | 1 | 1 | 1 | 1 | 1 |
| | | | #tests | 5 | 6 | 5 | 6 | 6 | 7 | 5 |
| | | | mean err | −1.4172 | −1.6947 | −1.1170 | −1.4162 | −1.4937 | −1.7713 | −1.1401 |

| Scene# | MAS ID | Truth % | Cirrus % | | | Error = Measured − Truth | | | | |
|---|---|---|---|---|---|---|---|---|---|---|
| 1 | 97047_21 | 51.33 | 43.1735 | 4.1394 | 1.2431 | 1.2431 | 3.8076 | 3.8076 | 1.1402 | 1.1402 |
| 2 | 97050_09 | 26.75 | 18.6906 | −4.1657 | −5.0715 | −5.0715 | −4.4495 | −4.4495 | −5.0809 | −5.0809 |
| 3 | 96110_26 | 61.36 | 60.1988 | −0.8238 | −1.1433 | −1.1433 | −0.8255 | −0.8255 | −1.1433 | −1.1433 |
| 4 | 96114_10 | 55.95 | 54.3096 | −1.2696 | −1.2736 | −1.2736 | −1.2696 | −1.2696 | −1.2736 | −1.2736 |
| 5 | 95116_02 | 78.66 | 78.0950 | 0.3876 | −0.1033 | −0.1033 | 0.3881 | 0.3876 | −0.1033 | −0.1033 |
| 6 | 01100_01 | 34.05 | 16.9678 | −6.3129 | −6.2901 | −6.3132 | −6.2899 | −6.3129 | −6.2901 | −6.3132 |
| 7 | 01100_02 | 60.58 | 53.1903 | −7.2378 | −7.2377 | −7.2378 | −7.2377 | −7.2378 | −7.2377 | −7.2378 |
| 8 | 01100_03 | 33.17 | 30.2151 | 0.1895 | 0.0958 | 0.0958 | 0.1899 | 0.1895 | 0.0958 | 0.0958 |
| 9 | 01100_04 | 0.64 | 0.3803 | −0.0363 | −0.0373 | −0.0373 | −0.0359 | −0.0363 | −0.0373 | −0.0373 |
| 10 | 01100_06 | 9.17 | 0.0000 | −4.9782 | −5.1183 | −5.1187 | −4.9469 | −4.9782 | −5.1183 | −5.1187 |
| 11 | 01100_07 | 22.36 | 1.7270 | 1.9105 | 1.0630 | 1.0607 | 1.9494 | 1.9105 | 1.0630 | 1.0607 |
| 12 | 01100_08 | 95.09 | 94.6252 | −0.0936 | −0.0941 | −0.0941 | −0.0924 | −0.0936 | −0.0941 | −0.0941 |
| 13 | 01100_09 | 26.26 | 0.7833 | −5.7930 | −6.2423 | −6.2423 | −5.7884 | −5.7930 | −6.2423 | −6.2423 |
| 14 | 01100_10 | 17.97 | 0.2624 | −4.0012 | −4.2455 | −4.2455 | −4.0007 | −4.0012 | −4.2455 | −4.2455 |
| 15 | 01110_03 | 2.01 | 0.0000 | −0.8333 | −0.8531 | −0.8532 | −0.8256 | −0.8333 | −0.8531 | −0.8532 |
| 16 | 01110_04 | 51.42 | 26.9409 | −1.7426 | −1.9426 | −1.9426 | −1.7426 | −1.7426 | −1.9426 | −1.9426 |
| 17 | 01110_05 | 84.58 | 81.2260 | 3.2415 | 3.2395 | 3.2395 | 3.2444 | 3.2415 | 3.2395 | 3.2395 |
| 18 | 01110_08 | 40.21 | 29.2289 | −1.5814 | −1.6000 | −1.6001 | −1.2898 | −1.5814 | −1.6000 | −1.6001 |
| 19 | 01110_11 | 57.00 | 48.7074 | −7.7821 | −8.1113 | −8.1113 | −7.7620 | −7.7821 | −8.1113 | −8.1113 |
| 20 | 01110_12 | 30.91 | 24.0226 | −6.1817 | −6.2068 | −6.2068 | −6.1620 | −6.1817 | −6.2068 | −6.2068 |
| 21 | 01110_13 | 48.18 | 45.0783 | −2.4473 | −2.4732 | −2.4732 | −2.4102 | −2.4473 | −2.4732 | −2.4732 |
| 22 | 01110_14 | 34.98 | 31.1644 | −2.4703 | −2.4859 | −2.4859 | −2.4699 | −2.4703 | −2.4859 | −2.4859 |
| 23 | 01110_15 | 79.84 | 77.3877 | 0.9417 | 0.7629 | 0.7627 | 0.9420 | 0.9417 | 0.7629 | 0.7627 |
| 24 | 01130_05 | 71.09 | 52.6079 | 0.0370 | 0.0370 | 0.0370 | 0.0370 | 0.0370 | 0.0370 | 0.0370 |
| 25 | 01130_07 | 62.95 | 48.5385 | 2.5476 | 2.4181 | 2.4177 | 2.5489 | 2.5476 | 2.4181 | 2.4177 |
| 26 | 01130_09 | 28.74 | 0.0002 | 0.2763 | −0.4654 | −0.4654 | 0.4605 | 0.2763 | −0.4654 | −0.4654 |
| 27 | 99030_01 | 52.68 | 23.1581 | −1.8294 | −3.2878 | −3.2878 | −1.8294 | −1.8294 | −3.2878 | −3.2878 |
| 28 | 95163_17 | 48.89 | 9.3589 | −0.5307 | −1.2679 | −1.2679 | −0.5307 | −0.5307 | −1.2679 | −1.2679 |
| 29 | 00176_05 | 50.89 | 0.0000 | 4.9030 | 9.2824 | 4.9030 | 9.2826 | 4.9030 | 9.2824 | 4.9030 |
| 30 | 00177_08 | 39.08 | 17.4549 | −1.6414 | 2.2787 | −1.6414 | 2.2878 | −1.6414 | 2.2787 | −1.6414 |
| | | Test# | 3 | 1 | 1 | 1 | 1 | 1 | 1 | 1 |
| | | | 4 | 0 | 0 | 0 | 0 | 0 | 0 | 0 |
| | | | 5 | 1 | 1 | 1 | 1 | 1 | 1 | 1 |
| | | | 6 | 1 | 1 | 1 | 1 | 1 | 1 | 1 |
| | | | 7 | 1 | 1 | 1 | 1 | 1 | 1 | 1 |
| | | | 8 | 0 | 1 | 1 | 0 | 0 | 1 | 1 |
| | | | 9 | 1 | 0 | 1 | 0 | 1 | 0 | 1 |
| | | | 10 | 1 | 1 | 1 | 1 | 1 | 1 | 1 |
| | | | #tests | 6 | 6 | 7 | 6 | 7 | 7 | 8 |
| | | | mean err | −1.4393 | −1.5044 | −1.7819 | −1.1607 | −1.4599 | −1.5081 | −1.7856 |

| Test# | Description |
|---|---|
| 1 | Cirrus band TOA reflectance >0.03; Always included in cloud % |
| 2 | NDSI test for shadowed snow; Does not impact cloud %; Not included in this analysis |
| 3 | NDSI test to eliminate snow |
| 4 | NIR/SWIR1 test to eliminate snow |
| 5 | NDSI test to eliminate bright ground |
| 6 | D test to eliminate veg |
| 7 | DSVI test to eliminate non-smooth features |
| 8 | SWIR1 band TOA reflectance test to eliminate dark features |
| 9 | Red band TOA reflectance test to eliminate dark features |
| 10 | NIR/SWIR1 test to eliminate bright ground |

Figure 4:
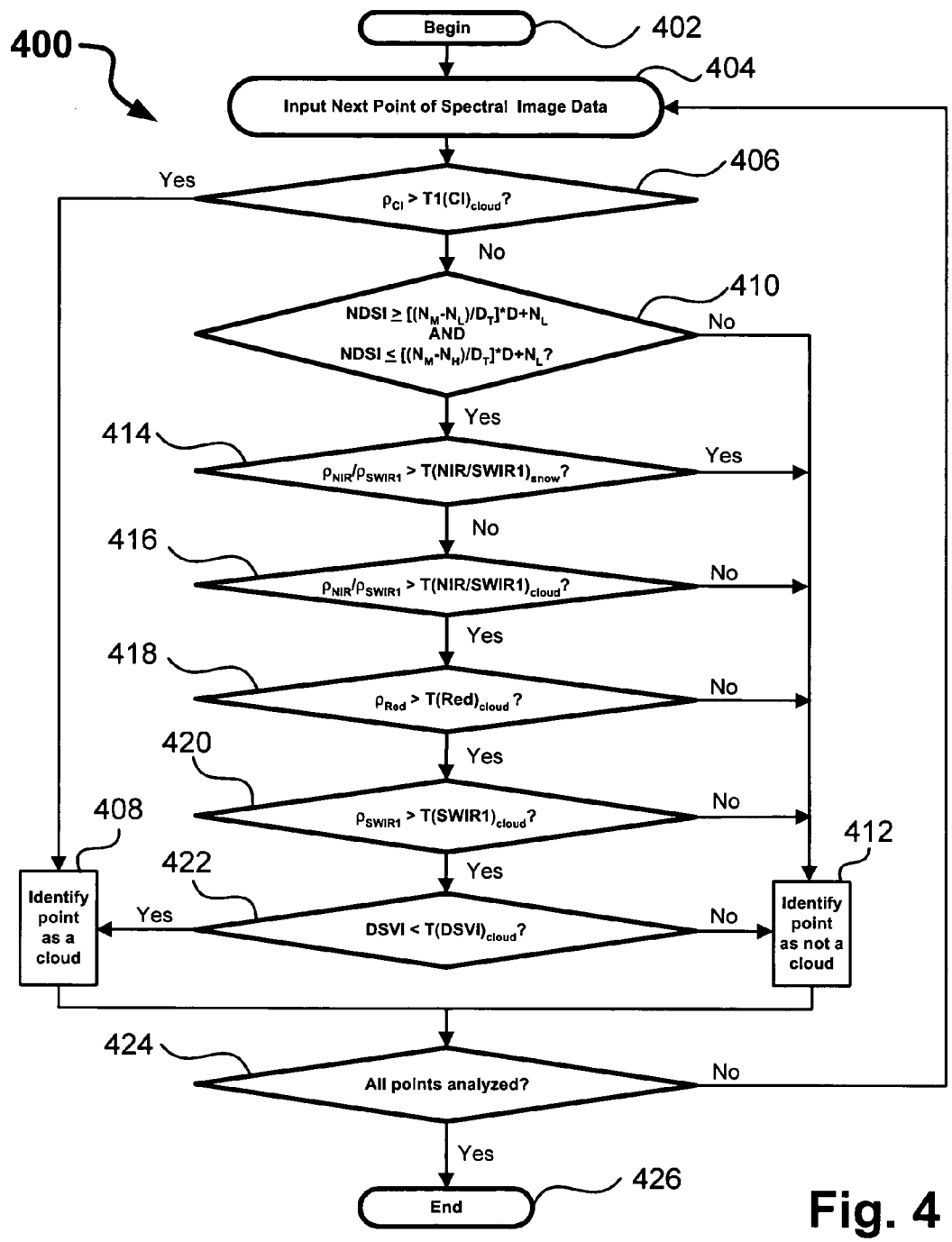
FIG. 4 is a flowchart of a routine according to another embodiment of the present invention for determining presence of cloud formations.

FIG. 4 shows a second embodiment of a routine 400 for classifying data points as cloud points or non-cloud points. The routine 400 begins at a block 402, and a next point of top of atmosphere visible, near-infrared, and short-wavelength infrared data is submitted for processing at a block 404. At a block 406, a comparison of the $\rho_{CI}$ to a cirrus-band threshold cloud value is made. If $\rho_{CI}$ exceeds the cloud threshold value, the data point is classified as a cloud point at a block 408. If not, the routine 400 proceeds to a next block to make a further comparison of whether the data point represents a cloud point or a non-cloud point.

If the comparison of the data point at the block 406 does not result in the data point being identified as a cloud point at the block 408, then at a block 410 the NDSI is compared to an NDSI minimum threshold value and an NDSI maximum threshold value. The NDSI thresholds are set according to empirical analysis of NDSI data such as that shown in FIG. 2. Unlike the routine shown in FIG. 3 which uses single-value cutoff thresholds, at the block 410 the threshold defines an area of the graph 200 (FIG. 2) as opposed to an intercept. More specifically, the comparison of NDSI at the block 410 is:

$$NDSI > [(N_M - N_L)/D_T]*D + N_L$$

AND $$NDSI < [(N_M - N_H)/D_T]*D + N_L$$

If either comparison is false, the data point is classified as a non-cloud point at a block 412. Values for these threshold calculation numbers are included in Table 2, below.

If the comparison of the data point at the block 410 does not result in the data point being identified as a non-cloud point at the block 412, at a block 414 a comparison of a NIR/SWIR1 reflectance ratio to a NIR/SWIR1 snow threshold reflectance ratio value is made. If the NIR/SWIR1 reflectance ratio value is greater than the NIR/SWIR1 reflectance ratio snow threshold value, the data point is classified as a non-cloud point at the block 412.

If the comparison of the data point at the block 414 does not result in the data point being identified as a non-cloud point at the block 412, then at a block 416 a comparison of a ratio of the NIR/SWIR1 reflectance ratio value to an NIR/SWIR1 reflectance ratio cloud threshold value is made. If the NIR/SWIR1 reflectance ratio value is less than the NIR/SWIR1 reflectance ratio cloud threshold value, the data point is classified as a non-cloud point at the block 412.

If the comparison of the data point at the block 416 does not result in the data point being identified as a non-cloud point at the block 412, then at a block 418 a comparison of $\rho_{Red}$ to a red wavelength reflectance cloud threshold value is made. If $\rho_{Red}$ is less than the red wavelength reflectance cloud threshold value, the data point is classified as a non-cloud point at the block 412.

If the comparison of the data point at the block 418 does not result in the data point being identified as a non-cloud point at the block 412, then at a block 420 a comparison of the short-wavelength reflectance, $\rho_{SWIR1}$, is made to a short-wavelength reflectance cloud threshold. If $\rho_{SWIR1}$ is less than the short-wavelength reflectance cloud threshold, the data point is classified as a non-cloud point at the block 412.

If the comparison of the data point at the block 420 does not result in the data point being identified as a non-cloud point at the block 412, then at a block 422 a comparison of the DSVI is made with a DSVI cloud threshold. If the DSVI exceeds the DSVI cloud threshold, the data point is classified as a non-cloud point at the block 412. On the other hand, if the DSVI is less than the DSVI cloud threshold, the data point is classified as a cloud point at the block 408.

Once the data points have been classified as one of a cloud point at the block 408 or as a non-cloud point at the block 412, then at a block 424 it is determined if all data points of interest have been classified. If not, the routine 400 loops to the block 404 where the next data point is addressed. However, if it is determined at the block 424 that all the data points of interest have been analyzed, the routine 400 ends at the block 426.

As previously described, the routine 400 uses threshold calculations empirically derived from manual or other studies of overhead imaging data. The threshold values may vary depending on the nature of the area of interest and the season during which the imaging data is captured. For example, threshold values for forests or closed shrub areas will vary between summer/tropical seasons and snowy seasons, just as the threshold values will vary between permanent wetlands and permanently snow-covered areas. Again, for example and not by way of limitation, Table 3 below lists representative threshold values that suitably may be used in the routine 400:

TABLE 3

| Scene | T(CI)$_{cloud}$ | $N_L$ | $N_M$ | $N_H$ | $D_T$ | T(NIR/SWIR1)$_{snow}$ | T(NIR/SWIR1)$_{cloud}$ | $\rho_{Red}$ | SWIR1 | DSVI |
|---|---|---|---|---|---|---|---|---|---|---|
| Forest - summer mid-latitude | 0.03 | −0.2 | −0.15 | 1 | 20 | N/A | 0.8 | 0.1 | 0.1 | 1 |
| Forest - tropical | 0.03 | −0.5 | −0.3 | 1 | 20 | N/A | 0.8 | 0.1 | 0.1 | 1 |
| Crops or Mosaic - Summer | 0.03 | −0.3 | −0.2 | 1 | 40 | N/A | 0.8 | 0.1 | 0.1 | 1 |
| Grass - Summer | 0.03 | −0.3 | −0.2 | 1 | 20 | N/A | 0.8 | 0.1 | 0.1 | 1 |
| Crops or Mosaic - Spring | 0.03 | −0.3 | −0.2 | 1 | 10 | N/A | 0.8 | 0.1 | 0.1 | 1 |
| Crops or Mosaic - Snow | 0.03 | −0.5 | −0.3 | 0.6 | 5 | 4 | 0.8 | 0.1 | 0.1 | 1 |
| Barren | 0.03 | −0.3 | −0.2 | 1 | 3 | N/A | 0.8 | 0.1 | 0.1 | 1 |
| Savanna or Open Shrub | 0.03 | −0.3 | −0.2 | 1 | 10 | N/A | 0.8 | 0.1 | 0.1 | 1 |

It will be appreciated that the routine 400 (FIG. 4) simplifies the selection of threshold values.

Figure 5:
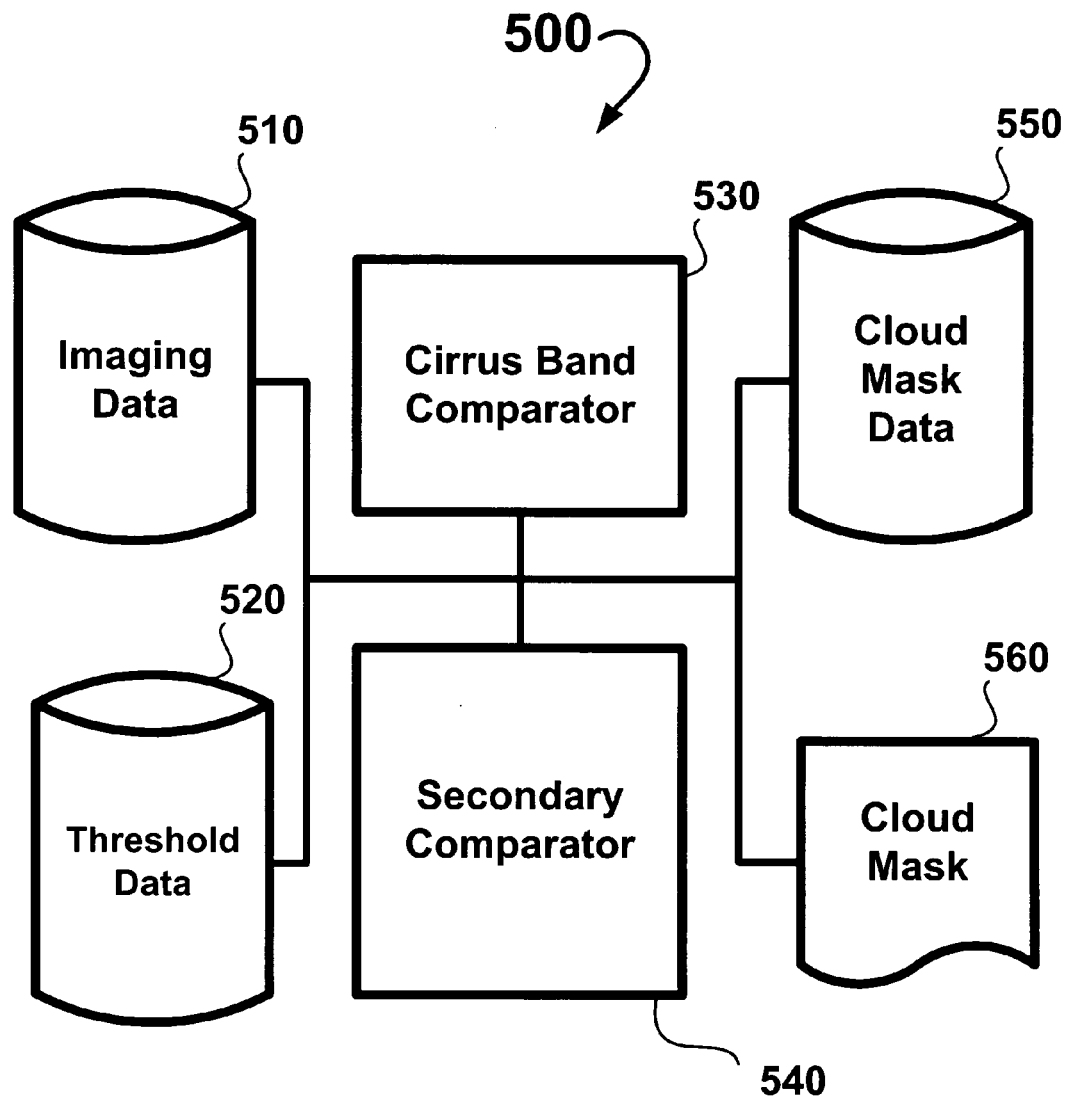
FIG. 5 is a block diagram of a system according to an embodiment of the present invention.

FIG. 5 shows a system 500 according to an embodiment of the present invention. Imaging data 510, including imaging data from at least one data point, is received. Threshold data 520, such as the parameters previously described in connection with FIGS. 3 and 4 and Tables 1 and 2, is supplied to the system for comparison. A cirrus band comparator 530 makes a first comparison of the data point with a cirrus band threshold. As previously described, if the cirrus band reflectance of the data point exceeds the cirrus band threshold, the data point is classified as a cloud point in cloud mask data 550 and/or a cloud mask 560. On the other hand, if use of the cirrus band comparator 530 does not result in classification of the data point, a secondary comparator 540 is applied to classify the data point. Using routines previously described in connection with FIGS. 3 and 4, the secondary comparator 540 uses additional cloud indicators and cloud indicator thresholds to classify the data points. When the secondary comparator 540 classifies the data point as either a cloud point or a non-cloud point, the data point is appropriately classified in the cloud mask data 550 and/or the cloud mask 560 in accordance with the predetermined classification precision determined by the threshold levels established for the comparisons being made. The system 500 suitably is applied to all data points in the imaging data 510 to generate cloud mask data 550 and/or a cloud mask 560 for the imaging data 510.

It will be appreciated that, in one embodiment of the invention, the determination as to acceptability of accuracy provided by a given set of tests and thresholds would be determined by processing a representative set of imagery off-line, and by evaluating resultant cloud masks in comparison with "truth" cloud masks produced by expert analysis. Adjustments would be iterated and evaluated for optimization, and production test hierarchy and thresholds would then be adjusted for subsequent on-line production runs.

As will be described below, embodiments of the invention for detecting presence of sub-visible clouds can be combined with embodiments of the invention previously for detection of visible clouds. As previously described, presence of visible clouds can de discerned using visible, near-infrared, and short wavelength infrared data. An aspect of embodiments of the previously-described invention involved comparing measured reflectance in a cirrus band with thresholds indicating presence or absence of visible clouds. Embodiments of the invention use cirrus band reflectance to discern presence or absence of sub-visible cirrus clouds as well.

Figure 6:
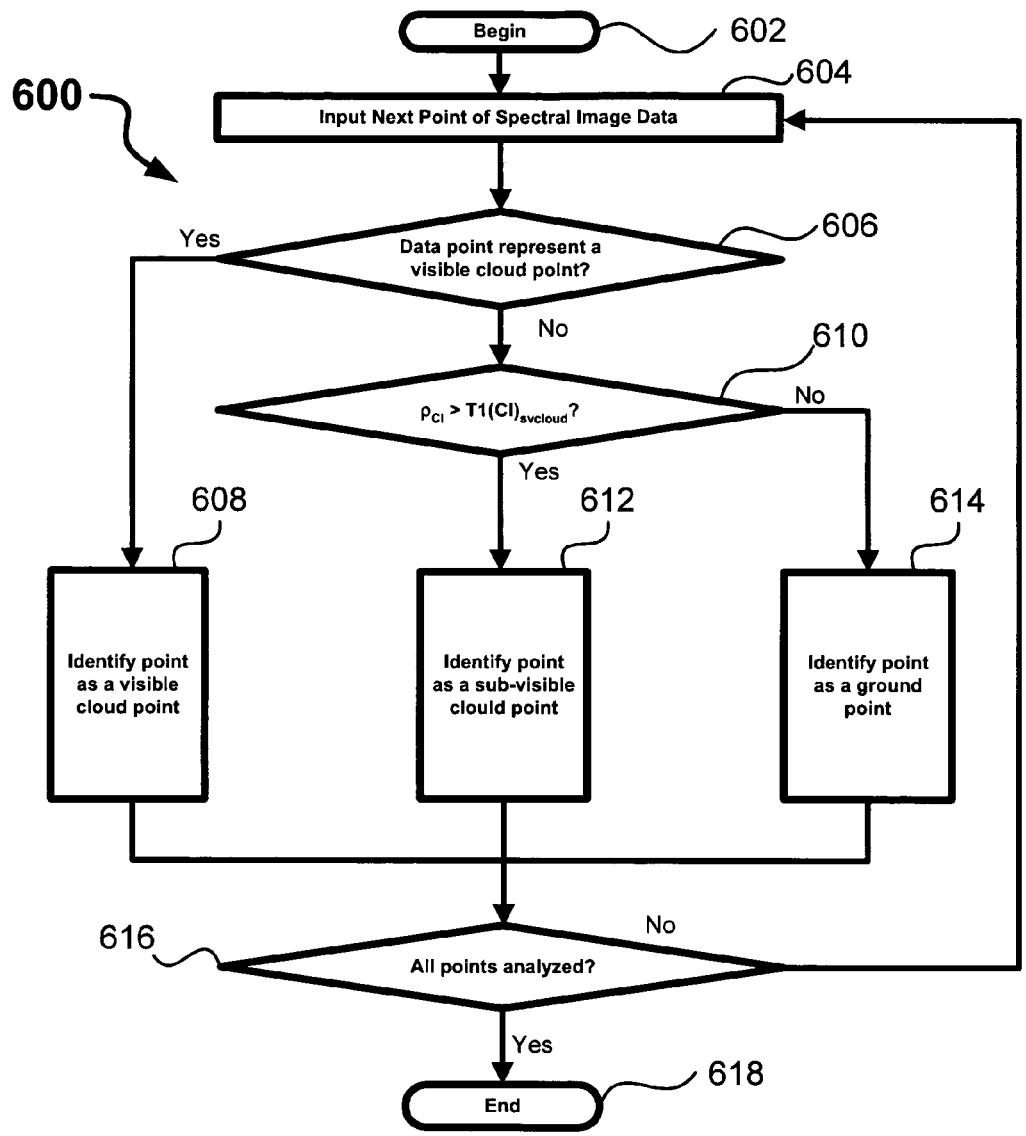
FIG. 6 is a flowchart of a routine for detecting presence of visible clouds and detecting sub-visible clouds according to an embodiment of the present invention.

FIG. 6 shows a routine 600 according to an embodiment of the present invention for detecting presence of sub-visible clouds as well as detecting presence of visible clouds. In the routine 600, it is first determined if the data point indicates the presence of a visible cloud, then it is determined if the data point indicates the presence of a sub-visible cloud.

The routine 600 begins at a block 602. At a block 604, a next point of top of atmosphere data is selected and input for processing. At a decision block 606, it is determined whether the data point indicates the presence of a visible cloud point. Whether the data point indicates the presence of a visible cloud as previously described may be determined using thermal imaging, or using another process. If at the decision block 606 it is determined that the data point indicates the presence of a visible cloud, at a block 608 the data point is classified as a visible cloud point. If at the decision block 606 it is determined that the data point does not indicate the presence of a visible cloud, then at a decision block 610 it is determined if the cirrus band reflectance of the data point exceeds the cirrus band reflectance threshold for a sub-visible cloud in accordance with the following Equation (5):

$$\rho_{CI} > T1(CI)_{svcloud} \qquad (5)$$

In one embodiment, the cirrus band approximately includes 1.88 µm wavelength and/or 1.38 µm wavelength cirrus bands. However, other cirrus bands that are similarly located within atmospheric water vapor absorption features suitably may be used with embodiments of the present invention.

In one particular embodiment, the sub-visible cirrus band reflectance threshold for detection of sub-visible cirrus clouds T1(CI) includes approximately a top-of-atmosphere reflectance of 0.01. The T1(CI) threshold selected may be a function of the sensor capability to reject effects of "out-of-band" radiation in its cirrus band, a function of sensor signal to noise ratio, and/or a function of the intended image processing end product error budget allocated to undetected thin cirrus clouds. The useful T1(CI) detection threshold for a given scene segment will also be a function of the influence of atmospheric water vapor and/or underlying Earth surface reflectance in preventing or enabling Earth-surface-reflected radiation to penetrate the atmosphere, reach the sensor, and act as contamination in the cirrus band.

If, at the decision block 610 it is determined that the cirrus band reflectance $\rho_{CI}$ of the data point exceeds the sub-visible cloud cirrus-band reflectance threshold T1(CI), then at a block 612 the data point is classified as representing a sub-visible cloud point. On the other hand, if at the decision block 610 it is determined that the cirrus-band reflectance of the data point does not exceed the cirrus-band reflectance threshold T1(CI), having already established at the decision block 606 that the data point does not indicate presence of a visible cloud, at a block 614 the data point is classified as a ground point.

At a decision block 616 it is determined whether all the data points for which analysis is desired have been tested according to the routine 600. If not all the desired data points have been tested, the routine 600 loops to the block 604 to receive and evaluate the next data point. On the other hand, if it is determined at the decision block 616 that all the desired data points have been evaluated, the routine ends at the block 618.

Figure 7:
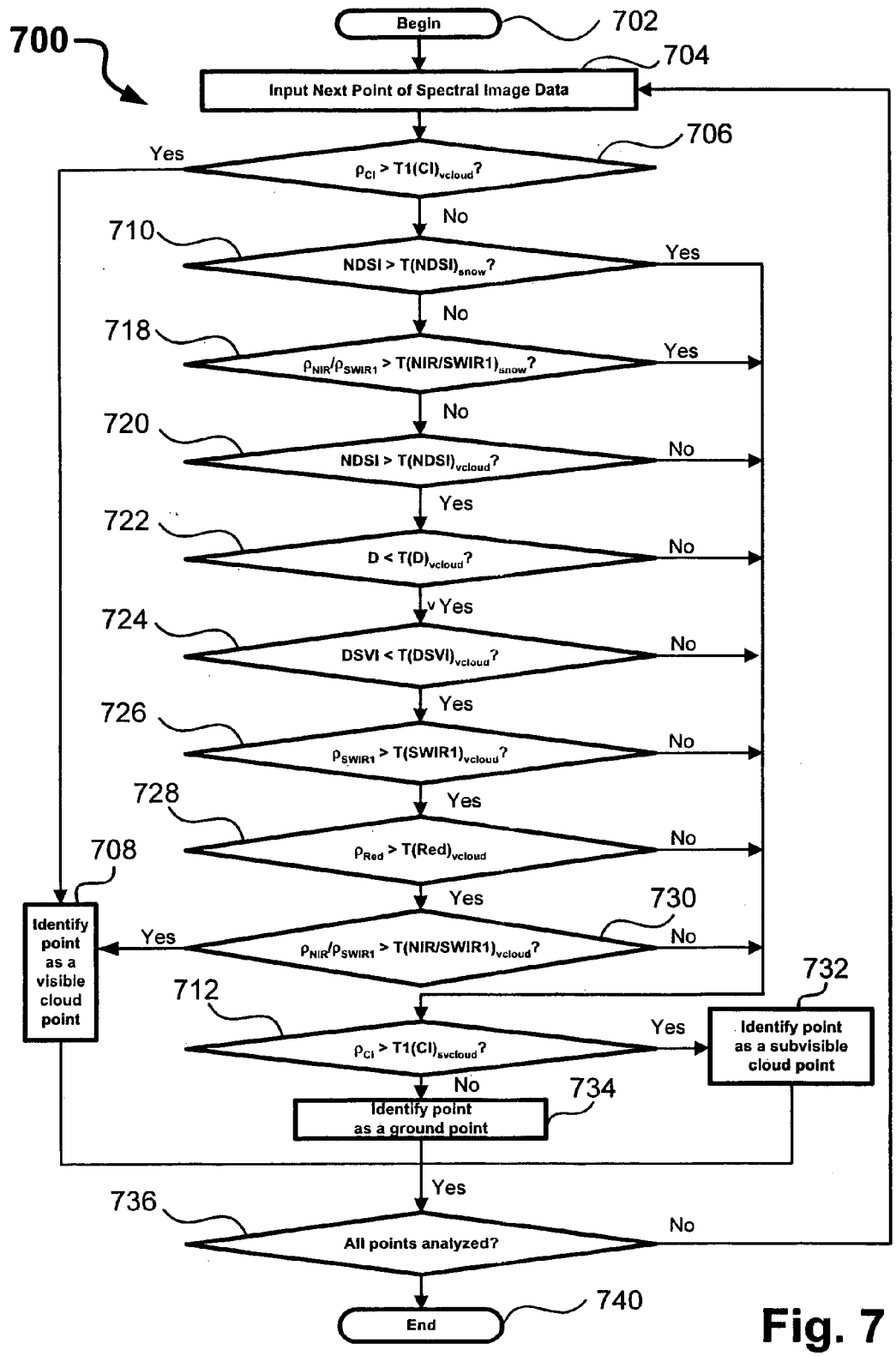
FIG. 7 is a flowchart of a routine according to an embodiment of the present invention for detecting presence of visible and sub-visible clouds using visible, near-infrared, and short wavelength infrared data.

FIG. 7 shows a routine 700 to determine the presence of both visible and sub-visible clouds using visible, near-infrared, and short-wavelength infrared data. In previously described routines 300 (FIG. 3) and 400 (FIG. 4), the threshold values were established for detection of visible clouds. As a result, the cloud threshold values have been re-labeled herein as visible cloud threshold values to clarify which tests are directed to detecting visible clouds distinct from tests used to discern the presence of sub-visible clouds in accordance with embodiments of the present invention.

The routine 700 begins at a block 702, and a next point of top of atmosphere, visible, near-infrared, and short-wavelength infrared data is submitted for processing at a block 704. At a block 706, a comparison of the $\rho_{CI}$ to a cirrus-band visible cloud threshold value T1(CI)$_{vcloud}$ is made. If $\rho_{CI}$ exceeds the visible cloud threshold value, the data point is classified as a visible cloud point at a block 708. If not, the routine 700 proceeds to a decision block 710 to make a further comparison of whether the data point represents a visible cloud point.

In one particular embodiment, the $\rho_{CI}$ comparison at the block 706 is made at a wavelength of 1.88 µm. At this wavelength, the reflectance has been determined to be more reliable than at slightly lower wavelengths. Of course, in alternate embodiments, $\rho_{CI}$ may be tested at wavelengths other than 1.88 µm, such as at 1.38 µm or other cirrus bands.

If the comparison of $\rho_{CI}$ at the block 706 to make an initial determination of whether the data point is a visible cloud point did not result in the data point being classified as a visible cloud point at the block 708, additional comparisons can be made to further differentiate whether the data point is a cloud point or a non-cloud point. The comparisons and number of comparisons selected suitably are chosen to balance between computational simplicity and classification precision. Generally, up to some point of optimal performance, as a greater number of comparisons are performed, greater precision may be obtained in determining presence of visible cloud points. Nonetheless, selecting a fewer number of comparisons may result in a desirable degree of accuracy with fewer comparisons and/or calculations being made.

More specifically, if the comparison of the data point at the block 706 results in the data point not being identified as a visible cloud point at the block 708, at a decision block 710 the NDSI is compared to an NDSI snow threshold value. This comparison may eliminate data points showing snow. If the data point NDSI is greater than the NDSI snow threshold value, the data point may reflect a snow point. Again, the NDSI threshold value may be empirically determined using other information from which data points have previously been classified as cloud points or non-cloud points. If at the decision block 710 the NDSI exceeds the NDSI snow threshold value, the data point is identified as not being a visible cloud point, and then the data point is evaluated at a decision block 712 to determine whether the data point indicates presence of a sub-visible cloud as will be described further below.

It will be appreciated how threshold values like the NDSI snow threshold value compared at the decision block 710 can affect classification precision. If, for example, the NDSI snow threshold is lowered, more data points may be classified as not being visible-cloud points. If analysis reveals that this revision results in a net improvement in classification accuracy, application of further comparisons in the routine 700 may be avoided. Adjusting the thresholds in the tests described will determine how the individual data points in thinly cloud covered areas are classified. Accordingly, selection of thresholds based on empirical analysis of tested values for test data points known to be cloud points or non-cloud points over specific categories of land cover, location and season will incorporate a predetermined classification accuracy into embodiments of the present invention.

If the comparison of the data point at the decision block 710 results in the data point not being identified as a snow point, then at a decision block 718, a comparison of a ratio of the near infrared reflectance data to the short-wavelength infrared reflectance data, NIR/SWIR1, to a NIR/SWIR1 reflectance ratio snow threshold value is made to potentially eliminate additional data points showing snow. If the NIR/SWIR1 value exceeds the NIR/SWIR1 reflectance ratio snow threshold value, the data point is identified as not being a visible-cloud point and the routine 700 proceeds to the decision block 712.

If the comparison of the data point at the decision block 718 results in the data point not being identified as a snow point, then at a decision block 720 a comparison of the NDSI value to an NDSI cloud threshold value is made to potentially eliminate data points showing bright ground. If the NDSI value is less than the NDSI cloud threshold value, the data point is identified as not being a visible-cloud point and the routine 700 proceeds to the decision block 712.

If the comparison of the data point at the decision block 720 results in the data point not being identified as a bright ground point, then at a decision block 722 a comparison of the D variable is made with a D variable visible cloud threshold to potentially eliminate data points showing vegetation. If the D variable is greater than the D variable visible cloud threshold, the data point is identified as not being a visible-cloud point and the routine 700 proceeds to the decision block 712.

If the comparison of the data point at the decision block 722 results in the data point not being identified as a vegetation point, then at a decision block 724 a comparison of a D spatial variability index, DSVI, is made with a DSVI visible cloud threshold to potentially eliminate data points showing non-smooth features as previously described. If the DSVI is greater than the DSVI visible cloud threshold value, the data point is identified as not being a visible-cloud point and the routine 700 proceeds to the decision block 712.

If the comparison of the data point at the block 724 results in the data point not being identified as a non-smooth feature, then at a decision block 726 a comparison of the short-wavelength reflectance, $\rho_{SWIR1}$, is made to a short-wavelength reflectance visible cloud threshold to potentially eliminate data points showing dark features. If $\rho_{SWIR1}$ is less than the short-wavelength reflectance visible cloud threshold, the data point is identified as not being a visible cloud point and the routine 700 proceeds to the decision block 712.

If the comparison of the data point at the block 726 results in the data point not being identified as a dark feature, then at a decision block 728 a comparison of $\rho_{Red}$ to a red wavelength visible cloud threshold value is made to eliminate additional data points showing dark features. If $\rho_{Red}$ is less than the red wavelength visible cloud threshold value, the data point is identified as not being a visible cloud point and the routine 700 proceeds to the decision block 712.

If the comparison of the data point at the block 728 results in the data point not being identified as a dark feature, then at a decision block 730 a comparison of the NIR/SWIR1 reflectance ratio to a NIR/SWIR1 reflectance ratio visible cloud threshold value is made potentially to eliminate additional data points showing bright ground. If the NIR/SWIR1 reflectance ratio value is less than the NIR/SWIR1 reflectance ratio visible cloud threshold value the data point is identified as not being a visible cloud point and the routine 700 proceeds to the decision block 712. On the other hand, if the NIR/SWIR1 reflectance ratio value is greater than the NIR/SWIR1 reflectance ratio visible cloud threshold value, the data point is classified as a visible cloud point at the block 708.

For data points not classified as being a visible cloud point at the block 708, at the decision block 712 it is determined if the cirrus band reflectance of the data point is greater than the cirrus band sub-visible cloud threshold. If the cirrus band reflectance of the data point is determined to exceed the sub-visible cloud threshold, at the block 732 the data point is classified as a sub-visible cloud point. On the other hand, if it is determined at the decision block 712 that the cirrus-band reflectance of the data point does not exceed the sub-visible cloud threshold, at a block 734 the data point is identified as a ground point.

Once the data points have been classified as one of a cloud point at the block 708, a sub-visible cloud point at the block 732, or as a ground point at the block 734, at a decision block 736 it is determined if all data points of interest have been classified. If not, the routine 700 loops to the block 704 where the next data point is received for evaluation. However, if it is determined at the block 736 that all the data points of interest have been analyzed, the routine 700 ends at the block 740.

As previously described, the routine 700 uses visible cloud and sub-visible cloud thresholds empirically derived from manual or other studies of overhead imaging data. The threshold values may vary depending on the nature of the area of interest and the season during which the imaging data is captured. For example, threshold values for forests or closed shrub areas will vary between summer/tropical seasons and winter seasons, just as the threshold values will vary between permanent wetlands and arid areas, etc.

Figure 8:
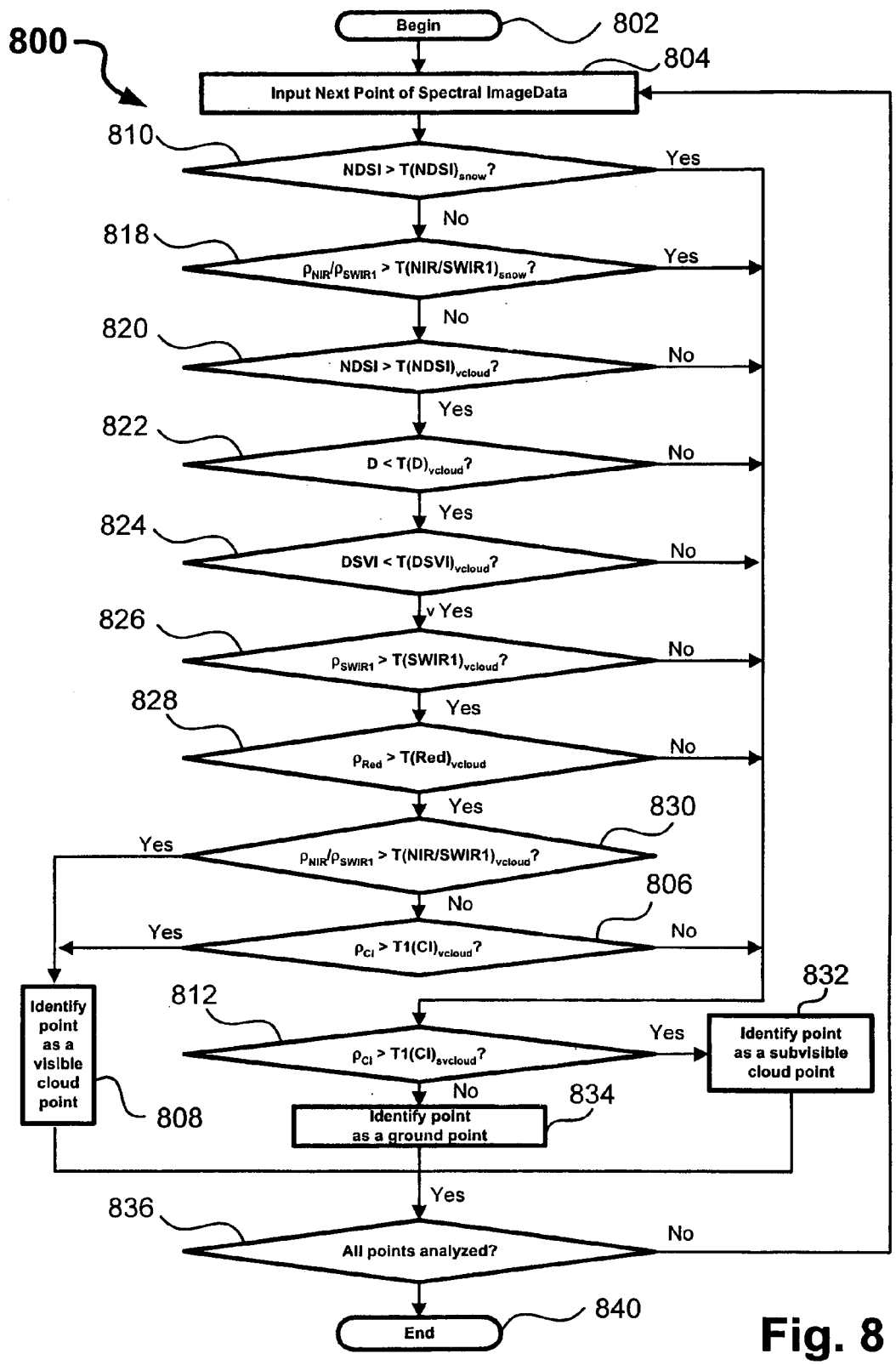
FIG. 8 is a flowchart of a routine according to another embodiment of the present invention.

FIG. 8 shows another embodiment of a routine 800 to determine the presence of both visible and sub-visible clouds using visible, near-infrared, and short-wavelength infrared data. The routine 800 advantageously supports correction for thin cirrus effects in regions where there are no underlying low clouds. Generally, the routine 800 employs the same comparisons, but the comparisons are ordered differently.

The routine 800 begins at a block 802, and a next point of top of atmosphere, visible, near-infrared, and short-wavelength infrared data is submitted for processing at a block 804. At a decision block 810 the NDSI is compared to an NDSI snow threshold value. This comparison may eliminate data points showing snow. If the data point NDSI is greater than the NDSI snow threshold value, the data point may reflect a snow point. Again, the NDSI threshold value may be empirically determined using other information from which data points have previously been classified as cloud points or non-cloud points. If at the decision block 810 the NDSI exceeds the NDSI snow threshold value, the data point is identified as not being a visible cloud point, and then the data point is evaluated at a decision block 812 to determine whether the data point indicates presence of a sub-visible cloud as will be described further below.

It will be appreciated how threshold values like the NDSI snow threshold value compared at the decision block 810 can affect classification precision. If, for example, the NDSI snow threshold is lowered, more data points may be classified as not being visible-cloud points. If analysis reveals that this revision results in a net improvement in classification accuracy, application of further comparisons in the routine 800 may be avoided. Adjusting the thresholds in the tests described will determine how the individual data points in thinly cloud-covered areas are classified. Accordingly, selection of thresholds based on empirical analysis of tested values for test data points known to be cloud points or non-cloud points over specific categories of land cover, location and season will incorporate a predetermined classification accuracy into embodiments of the present invention.

If the comparison of the data point at the decision block 810 results in the data point not being identified as a snow point, then at a decision block 818, a comparison of a ratio of the near infrared reflectance to the short-wavelength infrared reflectance, NIR/SWIR1, to a NIR/SWIR1 reflectance ratio snow threshold value is made potentially to eliminate additional data points showing snow. If the NIR/SWIR1 reflectance ratio value exceeds the NIR/SWIR1 reflectance ratio snow threshold value, the data point is identified as not being a visible-cloud point and the routine 800 proceeds to the decision block 812.

If the comparison of the data point at the decision block 818 results in the data point not being identified as a snow point, then at a decision block 820 a comparison of the NDSI value to an NDSI cloud threshold value is made to potentially eliminate data points showing bright ground. If the NDSI value is less than the NDSI cloud threshold value, the data point is identified as not being a visible-cloud point and the routine 800 proceeds to the decision block 812.

If the comparison of the data point at the decision block 820 results in the data point not being identified as a bright ground point, then at a decision block 822 a comparison of the D variable is made with a D variable visible cloud threshold to potentially eliminate data points showing vegetation. If the D variable is greater than the D variable visible cloud threshold, the data point is identified as not being a visible-cloud point and the routine 800 proceeds to the decision block 812.

If the comparison of the data point at the decision block 822 results in the data point not being identified as a vegetation point, then at a decision block 824 a comparison of a D spatial variability index, DSVI, is made with a DSVI visible cloud threshold to potentially eliminate data points showing non-smooth features as previously described. If the DSVI is greater than the DSVI visible cloud threshold value, the data point is identified as not being a visible-cloud point and the routine 800 proceeds to the decision block 812.

If the comparison of the data point at the block 824 results in the data point not being identified as a non-smooth feature, then at a decision block 826 a comparison of the short-wavelength reflectance, $\rho_{SWIR1}$, is made to a short-wavelength reflectance visible cloud threshold to potentially eliminate data points showing dark features. If $\rho_{SWIR1}$ is less than the short-wavelength reflectance visible cloud threshold, the data point is identified as not being a visible cloud point and the routine 800 proceeds to the decision block 812.

If the comparison of the data point at the block 826 results in the data point not being identified as a dark feature, then at a decision block 828 a comparison of $\rho_{Red}$ to a red wavelength visible cloud threshold value is made to eliminate additional data points showing dark features. If $\rho_{Red}$ is less than the red wavelength visible cloud threshold value, the data point is identified as not being a visible cloud point and the routine 800 proceeds to the decision block 812.

If the comparison of the data point at the block 828 results in the data point not being identified as a dark feature, then at a decision block 830 a comparison of the NIR/SWIR1 reflectance ratio to a NIR/SWIR1 reflectance ratio visible cloud threshold value is made potentially to eliminate additional data points showing bright ground. If the NIR/SWIR1 reflectance ratio value is less than the NIR/SWIR1 reflectance ratio visible cloud threshold value the data point is identified as not being a visible cloud point and the routine 800 proceeds to the decision block 806. On the other hand, if the NIR/SWIR1 reflectance ratio value is greater than the NIR/SWIR1 reflectance ratio visible cloud threshold value, the data point is classified as a visible cloud point at the block 808.

At a decision block 806, a comparison of the $\rho_{CI}$ to a cirrus-band threshold visible cloud threshold value $T1(CI)_{vcloud}$ is made. It should be noted that the routine 800 is well suited to areas where there are no underlying low clouds. For images reliably determined to have no underlying low clouds, the comparison made at the decision block 806 may be bypassed, resulting in better computational simplicity.

If $\rho_{CI}$ exceeds the visible cloud threshold value, the data point is classified as a visible cloud point at a block 808. If not, the routine 800 proceeds to a decision block 812 to make a further comparison of whether the data point represents a visible cloud point.

In one particular embodiment, as previously described, the $\rho_{CI}$ comparison at the block 806 is made at a wavelength of 1.88 μm. At this wavelength, the reflectance has been determined to be more reliable than at slightly lower wavelengths. Of course, in alternate embodiments, $\rho_{CI}$ may be tested at wavelengths other than 1.88 μm, such as at 1.38 μm or other cirrus bands. If the comparison of the data point at the block 806 results in the data point not being identified as a visible cloud point at the block 808.

For data points not classified as being a visible cloud point at the block 808, at the decision block 812 it is determined if the cirrus band reflectance of the data point is greater than the cirrus band sub-visible cloud threshold. If the cirrus band reflectance of the data point is determined to exceed the sub-visible cloud threshold, at the block 832 the data point is classified as a sub-visible cloud point. On the other hand, if it is determined at the decision block 812 that the cirrus-band reflectance of the data point does not exceed the sub-visible cloud threshold, at a block 834 the data point is identified as a ground point.

Once the data points have been classified as one of a cloud point at the block 808, a sub-visible cloud point at the block 832, or as a ground point at the block 834, at a decision block 836 it is determined if all data points of interest have been classified. If not, the routine 800 loops to the block 804 where the next data point is received for evaluation. However, if it is determined at the block 836 that all the data points of interest have been analyzed, the routine 800 ends at the block 840.

As previously described, the routine 800 uses visible cloud and sub-visible cloud thresholds empirically derived from manual or other studies of overhead imaging data. The threshold values may vary depending on the nature of the area of interest and the season during which the imaging data is captured. For example, threshold values for forests or closed shrub areas will vary between summer/tropical seasons and winter seasons, just as the threshold values will vary between permanent wetlands and arid areas, etc.

Figure 9:
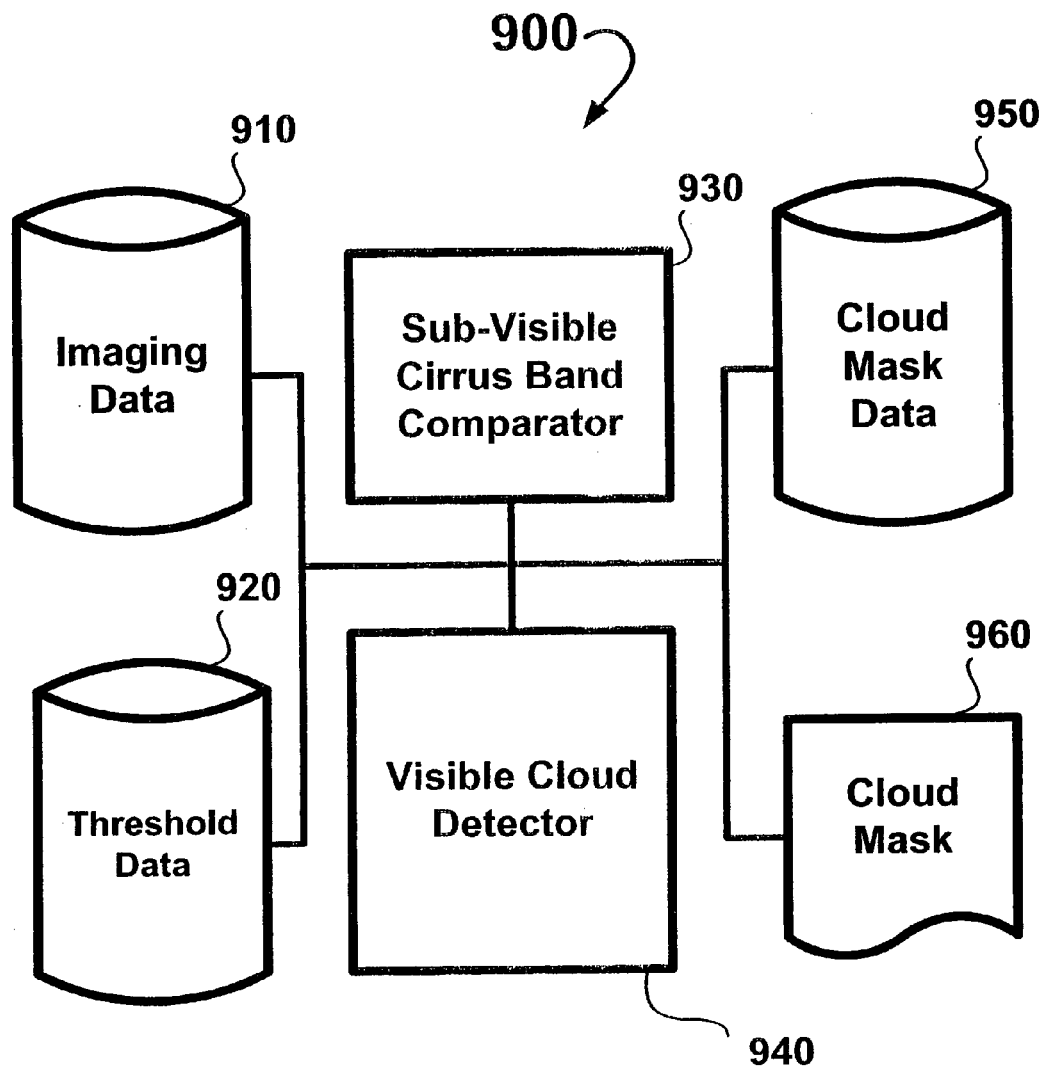
FIG. 9 is a block diagram of a system according to an embodiment of the present invention for detecting sub-visible clouds.

FIG. 9 shows a system 900 according to an embodiment of the present invention. Imaging data 910, including imaging data from at least one data point, is received. A set of threshold data 920, such as the parameters previously described in connection with FIGS. 6, 7, and 8 supplied to the system for comparison. A cirrus band comparator 930 compares the cirrus-band reflectance value for each data point being evaluated with a cirrus band sub-visible cloud threshold to detect sub-visible clouds. A visible cloud detector 940, using thermal imaging, using visible, near visible infrared, and short-wavelength infrared data, or using another process to determine the presence of visible clouds is used to determine the presence of visible clouds as desired. If the cirrus band reflectance of the data point exceeds the sub-visible cirrus-band threshold, the data point is classified as a sub-visible cloud point in cloud mask data 950 and/or a cloud mask 960. If the data point is identified as representing presence of a visible cloud, the data point is classified as a visible cloud point in the cloud mask data 950 and/or the cloud mask 960. The system 900 suitably is applied to all data points in the imaging data 910 to generate cloud mask data 950 and/or a cloud mask 960 for the imaging data 910.

It will be appreciated that, in one embodiment of the invention, the determination as to acceptability of accuracy provided by a given set of tests and thresholds would be determined by processing a representative set of imagery off-line, and by evaluating resultant cloud masks in comparison with "truth" cloud masks produced by expert analysis. Adjustments would be iterated and evaluated for optimization, and production test hierarchy and thresholds would then be adjusted for subsequent on-line production runs.

It should be understood that the system 900 shown in FIG. 9 may have a variety of alternate embodiments, and that the invention is not limited to the particular system embodiment shown in FIG. 9. For example, one or more of the various components of the system 900 may be combined with other components, or may be divided into separate components, to produce alternate embodiments of systems in accordance with the present invention. Alternately, in a representative embodiment, the system 900 includes a computer having a central processing unit (CPU) and a memory component. The memory component may include one or more memory modules, such as Random Access Memory (RAM) modules, Read Only Memory (ROM) modules, Dynamic Random Access Memory (DRAM) modules, and any other suitable memory modules. The computer may also include an input/output (I/O) component that may include a variety of known I/O devices, including network connections, video and graphics cards, disk drives or other computer-readable media drives, displays, or any other suitable I/O modules. In one particular aspect, a machine-readable medium may be used to store a set of machine-readable instructions (e.g. a computer program) into the computer, wherein the machine-readable instructions embody a method in accordance with the teachings of the present invention. The machine-readable medium may be any type of medium that can store data that is readable by the computer, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 900. Alternately, the machine-readable instructions may be implemented directly into one or more components of the system 900 without the assistance of the machine-readable medium.

As will be described below, embodiments of the present invention can be combined with embodiments of the inventions previously for detection of visible and sub-visible clouds. As previously described, presence of sub-visible clouds can de discerned using visible, near-infrared, and short wavelength infrared data. Embodiments of the present invention use spectral measurements to discern presence or absence of shadows as well.

Figure 10:
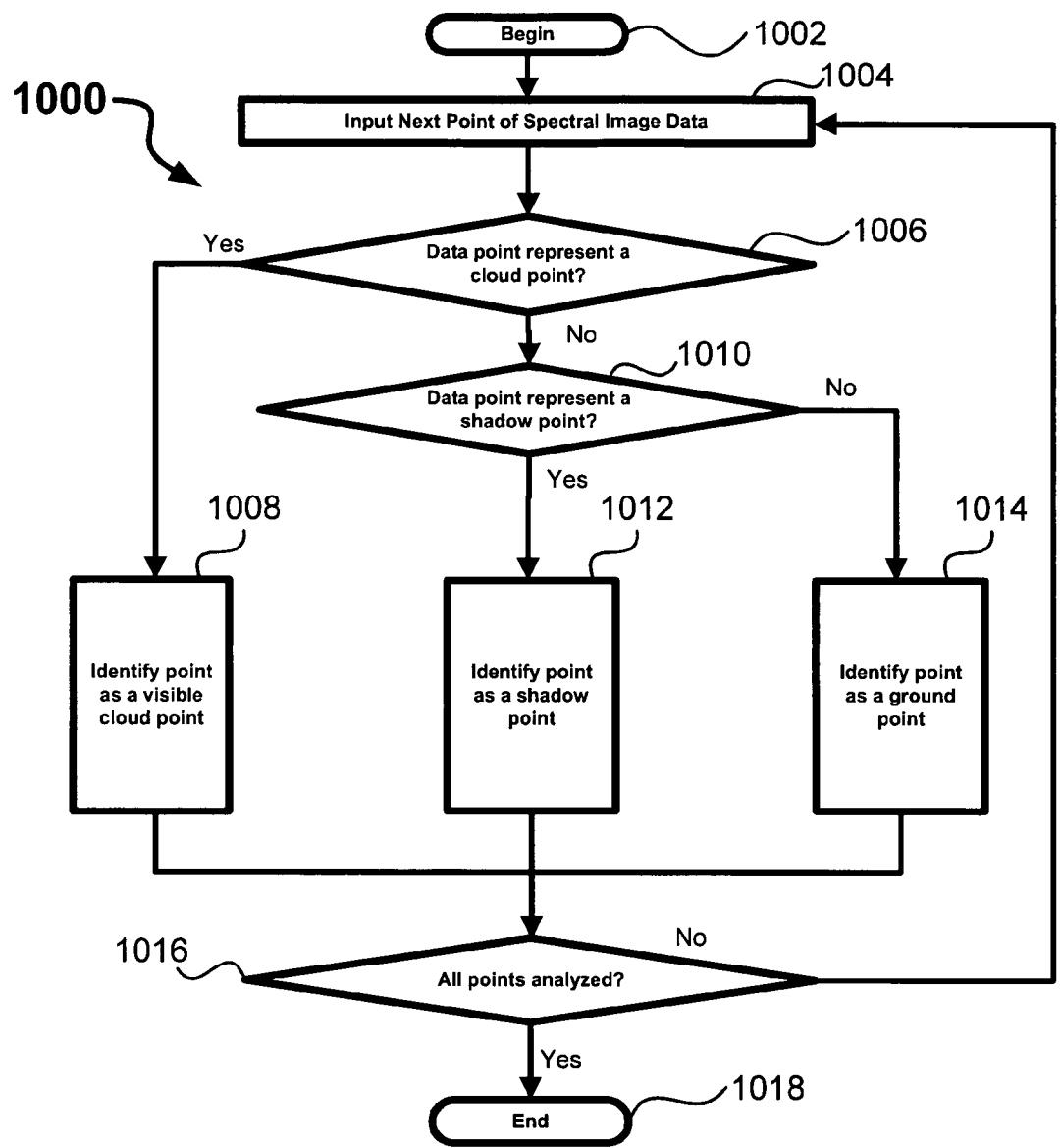
FIG. 10 is a flowchart of a general routine for differentiating between cloud points, shadow-covered points, and ground points.

FIG. 10 shows a routine 1000 according to an embodiment of the present invention for detecting presence of shadows as well as detecting presence of visible and sub-visible clouds. The routine 1000 begins at a block 1002. At a block 1004, a next point of top of atmosphere data is selected and input for processing. At a decision block 1006, it is determined whether the data point indicates the presence of a cloud point. Whether the data point indicates the presence of a cloud as previously described may be determined using thermal imaging, or using another process. If at the decision block 1006 it is determined that the data point indicates the presence of a cloud, at a block 1008 the data point is classified as a cloud point.

If at the decision block 1006 it is determined that the data point does not indicate the presence of a cloud, then at a decision block 1010 it is determined if one or more spectral measurements indicate a presence or absence of a shadow.

The spectral measurements are compared to spectral measurement thresholds that determine whether the one or more spectral measurements indicate the presence of absence of shadow. If, at the decision block 1010 it is determined that the spectral measurements associated with the data point indicate the presence of a shadow, then at a block 1012 the data point is classified as representing a shadow point. On the other hand, if at the decision block 1010 it is determined that one or more of the spectral measurements indicate the data point does not indicate the presence of a shadow point, at a block 1014 the data point is classified as a ground point.

At a decision block 1016 it is determined whether all the data points for which analysis is desired have been tested according to the routine 1000. If not all the desired data points have been tested, the routine 1000 loops to the block 1004 to receive and evaluate the next data point. On the other hand, if it is determined at the decision block 1016 that all the desired data points have been evaluated, the routine 1000 ends at a block 1018.

Spectral measurements are selected and spectral measurement thresholds set according to empirical analyses of imaging data showing the presence and absence of shadows. FIG. 11A shows overhead imaging data of an exemplary region of interest showing clouds, ground, and shadows. In particular, the image 1100 rendered from the data shows what can be verified as showing regions of ground 1102, clouds 1104, and a shadow 1106, which is a shadow of a cloud. If the shadow 1106 is not recognized and accounted for, the shadow 1106 might be misconstrued as a body of water or some other dark feature. Additionally, if quantitative spectral landcover information products are to be generated from the imagery, data points lying within cloud shadows will require different processing than will data points illuminated by direct sunlight. Embodiments of the present invention use spectral measurements and/or derived spectral indices compared with spectral measurement and/or index thresholds to identify shadows from the imaging data rendered in the image 1100.

FIG. 11B shows a graph 1110 plotting spectral measurements for a particular type of landcover region. In particular, the graph 1110 plots NDSI versus D, quantities described previously. By manually or otherwise examining spectral measurements taken from imaging data, it can be determined which regions of various graphed quantities indicate presence of water 1112, clouds 1114, and ground 1116, as previously described. Moreover, from analysis of the imaging data, it can be determined what measurements represent presence of shadows 1118. Thus, once it is known what spectral measurements represent a presence of shadows 1118, then presence of shadows 1118 automatically can be discerned from the imaging data comparable with the previously described methods for automatically identifying visible and sub-visible clouds.

FIG. 11C is a cloud mask 1120 showing clouds 1124 as differentiated from ground 1122 as automatically derived from spectral measurements. Comparably, FIG. 11D is a shadow mask 1130 superimposed on the image 1100 (FIG. 11A). Analysis of the image 1100 compared with spectral data such as the graph 1110 (FIG. 11B) derived from the imaging data allows for determination of spectral measurement thresholds used to automatically differentiate the shadows. Conversely, assuming the shadow mask 1130 is created automatically using spectral measurements, comparing the shadow mask 1130 with the image 1100 shows that the spectral measurements do discern the presence of shadows 1136 as distinct from ground 1132 or clouds 1134. With the shadows 1136 automatically identified, the shadows 1136 will not corrupt the imaging data such that the shadows 1136 will be misconstrued as bodies of water or other features.

Figure 12A:
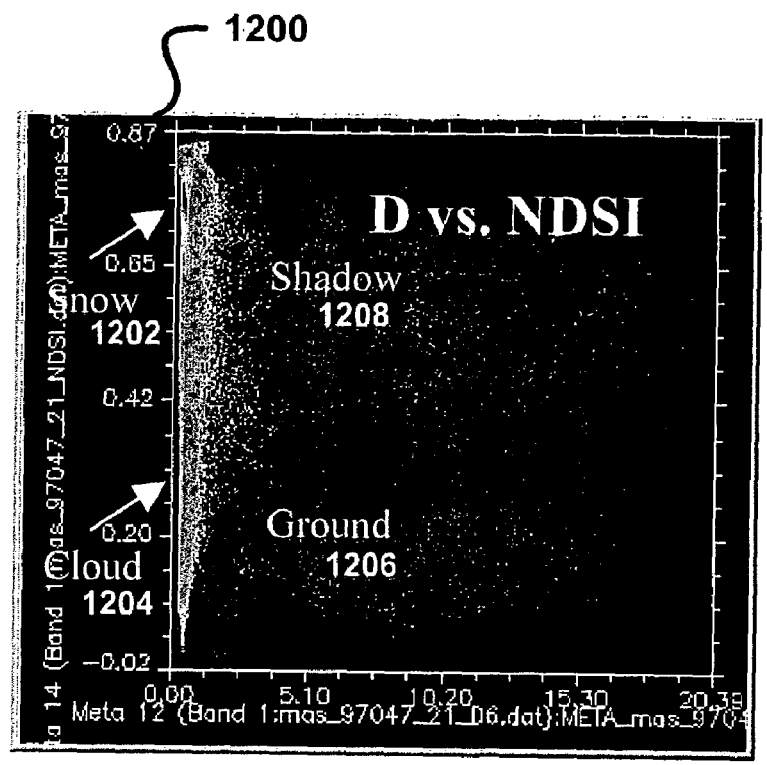
FIG. 12A is a graph plotting spectral measurements differentiating regions of snow, shadows, water, and ground.
Figure 12B:
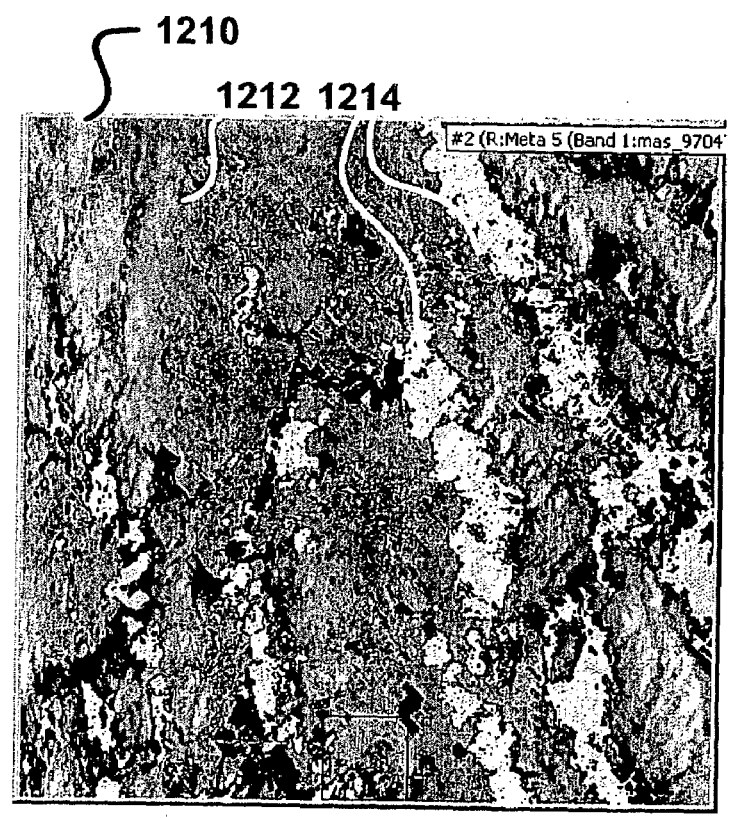
FIG. 12B is a shadow mask superimposed on the aerial image of FIG. 12A.

It will be appreciated that the spectral measurement thresholds should be adjusted depending on the type of landcover expected. FIG. 12A is a graph 1200 plotting spectral measurements of D versus NDSI differentiating regions of snow 1202, cloud 1204, non-snow-covered ground 1206 and shadow 1208. As described in connection with FIGS. 11A–D, using spectral measurements in connection with overhead images, it can be determined which spectral measurement and/or derived spectral indices, and which associated thresholds indicate the presence of shadows, as will be further described below. As can be appreciated from the graph 1200, when snow might be expected, in addition to differentiating shadows from ground and clouds, different spectral tests and/or thresholds will be involved in differentiating shadows from snow, clouds, or ground. FIG. 12B is a shadow mask 1210 for a region including snow-covered ground superimposed on the image 1200 (FIG. 12A). With the shadow mask 1210 derived from the spectral measurements and derived indices, snow-covered ground 1212 can be differentiated from snow-covered ground covered by shadow 1214.

As also will be appreciated, spectral measurement thresholds useful for differentiating between shadows and other features not only may change depending on expected landcover, but the spectral measurements themselves may change depending on the expected landcover. FIG. 13A is an aerial image 1300 of an exemplary region of interest showing vegetation 1302, wetlands 1304, water 1306, clouds 1307, and shadow 1308. To differentiate shadows from the different expected landcover in the image 1300, FIG. 13B shows a graph 1310 showing a plot of NIR reflectance versus SWIR1 reflectance to be able to differentiate shadows 1308 from wetlands 1304 and water 1306. The graph 1310 shows regions whose plotted measurements correspond with regions of vegetation or forest 1312, wetlands 1314, water 1316, clouds 1317, and shadow 1318. Again, the correlation of what spectral measurements and/or derived indices and what values of those spectral measurements or indices differentiate between features is determined empirically to then be able automatically to differentiate ground features using the spectral measurements and/or indices and associated thresholds derived from imaging data. It will be appreciated that the close juxtaposition of water and shadow in the graph 1310 highlights a difficulty in differentiating water from shadow in such data.

Composite masks are derivable according to embodiments of the present invention. Colors, shading, or other overlay content can be associated with spectral measurements to create a composite mask. For example, FIG. 13C shows a graph 1330 assigning different shades to vegetation 1312, wetlands 1314, water 1316, clouds 1317, and shadow 1318. Using these shades, FIG. 13D shows a mask 1340 assigning the shades to regions of vegetation 1302, wetlands 1304, water 1306, clouds 1307, and shadows 1308. Comparing the mask 1340 with the image 1300 (FIG. 13A) shows how correlation of spectral measurement or derived index data and corresponding thresholds advantageously provide for automatic differentiation of these different features.

Presently preferred embodiments of the present invention combine a plurality of comparisons between spectral measurements and/or derived indices, and associated thresholds accurately and automatically to identify regions of shadow. Combinations of comparisons provide for reliable identification of shadow from other features considering complexities potentially resulting from different ground cover including water, wetlands, vegetation, and other features.

Figure 14:
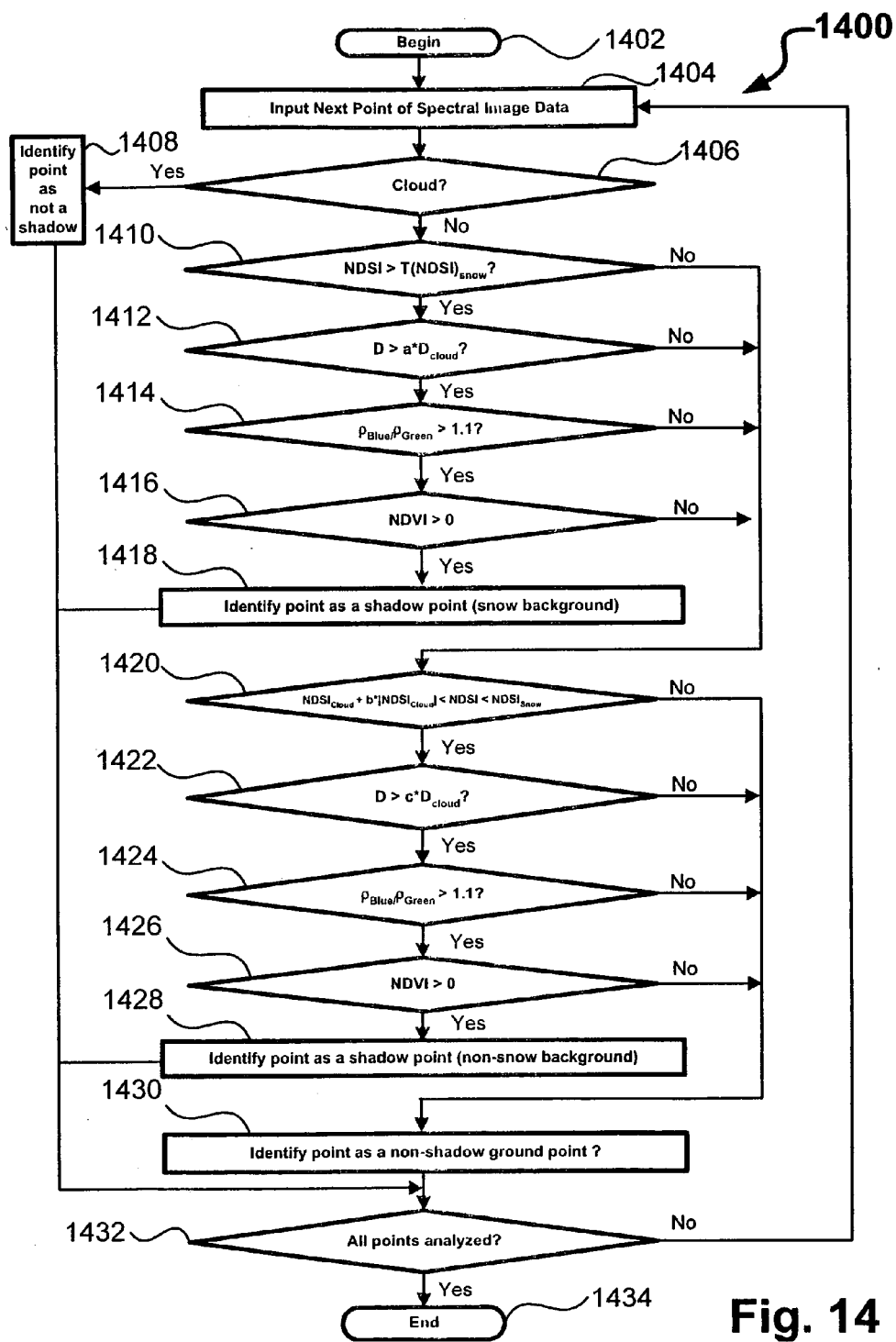
FIG. 14 is a flowchart of a routine for detecting presence of shadows according to an embodiment of the present invention.

FIG. 14 is a flowchart of an exemplary routine 1400 for detecting presence of shadows according to an embodiment of the present invention. The routine 1400 begins at a block 1402. At a block 1404, a next top of atmosphere data point is selected and input for analysis. Using routines in accordance with embodiments of the present invention, measured, pixel-level at-sensor radiance is converted into top-of-atmosphere reflectance values in order to minimize variation due to solar elevation angle with season and with latitude along an aerial or orbital track. Conversion to top-of-atmosphere reflectance values minimizes need for variation of spectral measurement thresholds that would result from having to otherwise account for solar elevation angle variability.

In preferred embodiments of the present invention, spectral measurements in accordance with previously described processes, thermal imaging, or other tests are used to differentiate clouds from other features. Identification of data points representing clouds simplifies the process by eliminating cloud points from having to be evaluated for the presence of shadow. If it is determined at the decision block 1406 that the data point includes a cloud, the data point is identified or classified as a cloud point at a block 1408, then the routine 1400 proceeds to a decision block 1432 to determine if all the data points have been evaluated.

On the other hand, if at the decision block 1406 it is determined if the data point does not include a cloud, the routine 1400 proceeds to a decision block 1410, representing a first comparison of a spectral measurement with a spectral measurement threshold to determine a presence of a shadow. At the decision block 1410 the NDSI previously described is compared with an NDSI snow threshold. Again, the NDSI threshold is empirically determined. If the NDSI exceeds the NDSI snow threshold, the data point potentially includes a shadow point over a snow background, and the routine 1400 proceeds to a decision block 1412 for further analysis. On the other hand, if it is determined at the decision block 1410 that the NDSI is less than the NDSI snow threshold, the data point will not be a shadow point over a snow background, and the routine 1400 proceeds to a decision block 1420 for other analysis.

At the decision block 1412, the D variable is compared with a D variable cloud threshold value multiplied by a landcover-dependent coefficient "a". The landcover-dependent coefficient "a" ranges from 1 to 5, varying in proportion to magnitude of the D variable cloud threshold. Values of the "a" coefficient may be tuned for specific land cover types and times of year via analysis of representative sets of imagery in comparison with ground truth developed by an expert analyst. In some embodiments, a default value for "a" of 1.5 is employed. If it is determined at the decision block 1412 that the D variable does not exceed the D variable cloud threshold value multiplied by the landcover-dependent coefficient "a", the data point is eliminated as unlikely to represent a shadow-covered point over a snow background and the routine 1400 proceeds to the decision block 1420. On the other hand, if it is determined at the decision block 1412 that the D variable exceeds the D variable cloud threshold value multiplied by the landcover-dependent coefficient "a", the data point potentially may include a shadow-covered point over a snow background, and the routine proceeds to a decision block 1414 for further evaluation.

At the decision block 1414, the ratio of blue band reflectance to green band reflectance is compared with a blue band to green band reflectance ratio threshold. This ratio is useful because the diffuse down-welling sky radiation that illuminates shadowed terrain is enhanced in the shorter-wavelength blue color, as compared with the direct solar radiation that is the major component illuminating naturally dark sunlit surfaces. Hence, the radiation reflected upward to a sensor from shadowed terrain tends to have a larger blue contribution than the radiation reflected upward to a sensor from a directly sunlit dark object. The blue band reflectance to green band reflectance ratio threshold for shadow identification, according to one empirically-derived embodiment of the present invention, is approximately 1.1. If the blue/green reflectance ratio does not exceed the blue/green reflectance ratio threshold, the data point is eliminated as unlikely to represent a shadow-covered point over a snow background and the routine 1400 proceeds to the decision block 1420. On the other hand, if it is determined at the decision block 1414 that the blue/green reflectance ratio exceeds the blue/green reflectance ratio threshold, the data point potentially may include a shadow-covered point over a snow background, and the routine proceeds to a decision block 1416 for further evaluation.

At the decision block 1416, a NDVI measurement as previously described is compared to a NDVI threshold for dark water bodies that, in this case, is approximately zero. Establishment of this threshold is based on inspection of a significant set of spectral imagery which revealed that dark water bodies preponderantly exhibit negative values of the NDVI index; an NDVI threshold of zero typically fails to separate only areas of very shallow water at the edges of water bodies. If the NDVI does not exceed the NDVI water threshold, the data point is determined not to represent a shadow-covered point over a snow background and the routine 1400 proceeds to the decision block 1420. On the other hand, if it is determined at the decision block 1416 that the NDVI is greater than zero, based on the combination of the comparisons performed at the decision blocks 1410, 1412, 1414, and 1416, the data point is identified as a shadow-covered point over a snow background. The routine 1400 then proceeds to the decision block 1432 to determine if all the data points have been evaluated.

If the data point has been determined not to be a shadow-covered point over a snow background, at the decision block 1420 a first comparison is made to determine if the data point might include a shadow-covered point over a non-snow terrain background. At the decision block 1420, the NDSI is compared to the NDSI cloud threshold plus the absolute value of the NDSI cloud threshold multiplied by a landcover-dependent coefficient "b". The landcover-dependent coefficient "b" ranges between values of 0 and 1. This relationship and valuation of "b" derives from the fact that the shadow-vs.-ground NDSI boundary of the cluster of shadow points in an NDSI vs. D plot, such as FIG. 11B, is incrementally higher than the NDSI cloud-vs.-ground boundary of the cluster of cloud points in that data plot. In some embodiments, values of "b" may be determined for specific landcover types, locations, and seasons by analysis of representative imagery and associated cluster distributions in NDSI vs. D data plots, in comparison with shadow masks prepared by an expert analyst. In a particular embodiment, a useful initial default value of "b" of 0.2 is used.

The NDSI also is compared to an NDSI snow threshold. If the NDSI exceeds the NDSI cloud threshold plus the absolute value of the NDSI cloud threshold multiplied by a landcover-dependent coefficient "b" but is less than the NDSI snow threshold, the data point potentially includes a shadow-covered point on a non-snow background and the routine 1400 proceeds to the decision block 1422. On the other hand, if the NDSI is either less than the NDSI cloud threshold plus the absolute value of the NDSI cloud threshold multiplied by a landcover-dependent coefficient "b" or exceeds the NDSI snow threshold, the data point is unlikely to be a shadow-covered point over a non-snow background and the data point is classified as a non-shadow ground point at a block 1430.

At the decision block 1422, the D variable is compared to a D variable cloud threshold multiplied by the landcover-dependent coefficient "c". In most embodiments, the landcover dependent coefficient ranges between 1 and 10. This relationship and this valuation range for "c" derives from the fact that the shadow-vs.-cloud D variable boundary of the cluster of shadow points in an NDSI vs. D plot, such as FIG. 11B, is quite broad and diffuse. Fewer ambiguous points will be included as shadow or cloud if the cloud and shadow thresholds in D are separated by use of the factor "c". In some embodiments, values of "c" may be determined for specific landcover types, locations, and seasons by analysis of representative imagery and associated NDSI vs. D data plots, in comparison with shadow masks prepared by an expert analyst. In a particular embodiment, a useful initial default value of "c" would be 1.5. On the other hand, a "c" value of 1.0 would result in all points in the ambiguous range of D, which also meet other criteria, being categorized as either cloud or shadow. Of course, other values of "c" are possible.

If the D variable exceeds the D variable cloud threshold multiplied by the landcover dependent coefficient "c", the data point potentially includes a shadow-covered point on a non-snow background and the routine 1400 proceeds to the decision block 1424. On the other hand, if the D variable does not exceed the D variable cloud threshold multiplied by the landcover dependent coefficient "c", the data point is eliminated as unlikely to be a shadow-covered point over a non-snow background and the data point is classified as a non-shadow ground point at the block 1430.

At the decision block 1424, the blue band to green band reflectance ratio is again compared with a blue/green reflectance ratio threshold as previously described in connection with the decision block 1414. If the blue/green reflectance ratio does not exceed the blue/green reflectance ratio threshold, the data point is eliminated as unlikely to be a shadow-covered point over a non-snow background, and the data point is classified as a non-shadow ground point at the block 1430. On the other hand, if it is determined at the decision block 1424 that the blue/green reflectance ratio exceeds the blue/green reflectance ratio threshold, the data point potentially may include a shadow-covered point over a non-snow background, and the routine proceeds to a decision block 1426 for further evaluation.

At the decision block 1428, a NDVI measurement is compared with the NDVI dark water body threshold of zero as previously described in connection with the decision block 1416. If the NDVI does not exceed the NDVI threshold, the data point is eliminated as unlikely to be a shadow-covered point over a non-snow background, and the data point is classified as a non-shadow ground point at the block 1430. On the other hand, if it is determined at the decision block 1428 that the NDVI is greater than zero, based on the combination of the comparisons performed at the decision blocks 1420, 1422, 1424, and 1426, the data point is identified as a shadow-covered point over a non-snow background at a block 1428. The routine 1400 then proceeds to the decision block 1432 to determine if all the data points have been evaluated.

At the decision block 1432, it is determined if all the data points have been evaluated. If not, the routine 1400 loops to the block 1404 for input of the next data point. On the other hand, if it is determined at the decision block 1432 that all the data points have been evaluated, the routine 1400 ends at a block 1434.

Note that routine 1400 may be tailored to the scenes to be processed, to the extent that blocks 1410, 1412, 1414, 1416 and 1418 may be eliminated for scenes which include no snow cover, while steps 1420, 1422, 1424, 1426 and 1428 may be eliminated for scenes which include only snow-covered land surfaces. Some processing efficiency can be realized by eliminating unnecessary tests in this manner.

Figure 15:
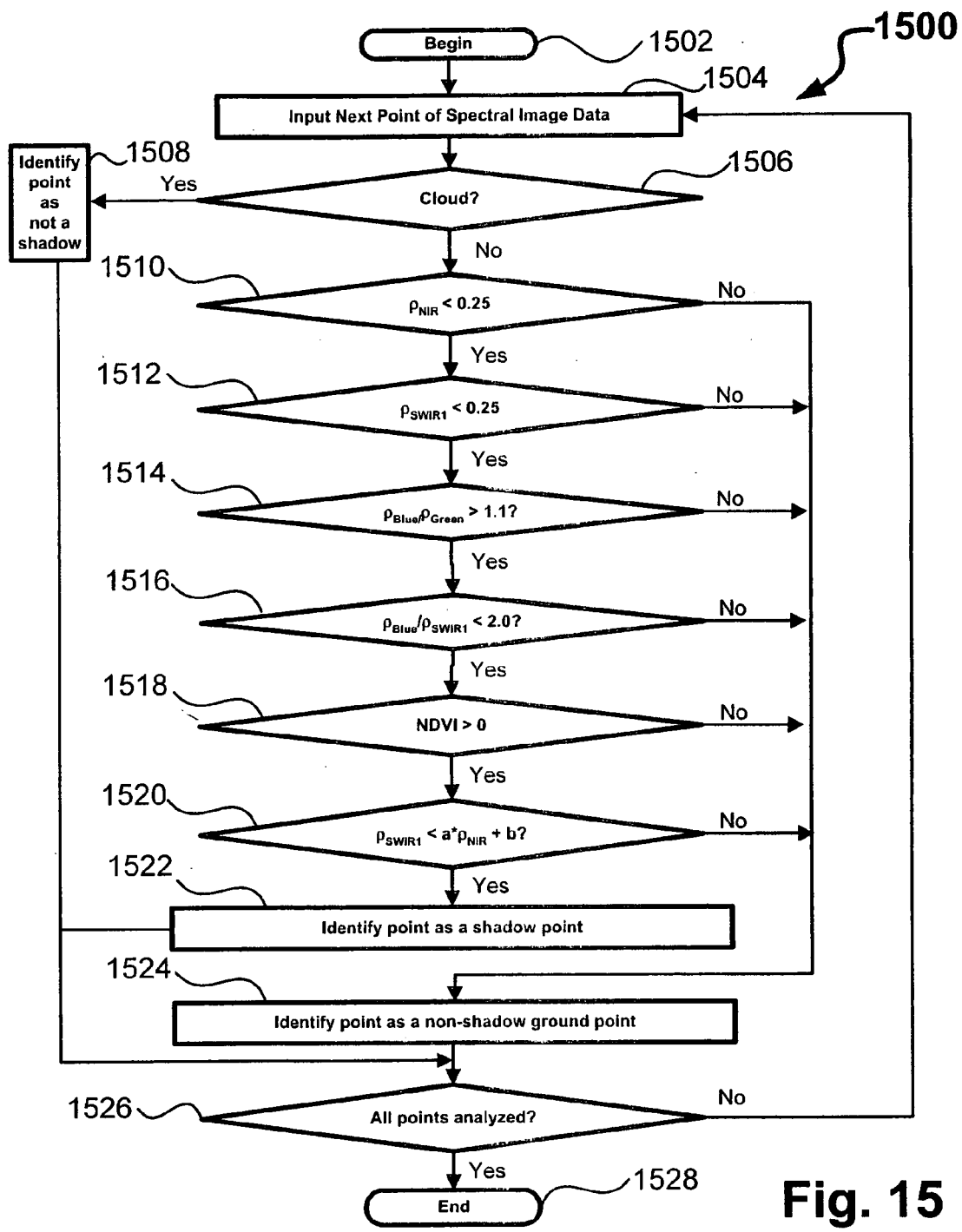
FIG. 15 is a flowchart of another routine for detecting presence of shadows according to an embodiment of the present invention.

FIG. 15 shows a flowchart of another routine 1500 according to another embodiment of the present invention to provide an efficient automated means to recognize shadowed data points in visible, near-infrared, and short-wave infrared spectral imagery. The routine 1500 begins at a block 1502. At a block 1504, a next top of atmosphere data point is selected and input for analysis. Again, using routines in accordance with embodiments of the present invention, measured, pixel-level at-sensor radiance is converted into top-of-atmosphere reflectance values in order to minimize variation due to solar elevation angle with season and with latitude along an aerial or orbital track as previously described.

Again, in preferred embodiments of the present invention, spectral measurements in accordance with previously described processes, thermal imaging, or other tests are used to differentiate clouds from other features. Identification of data points representing clouds simplify the process by eliminating those points from having to be evaluated for the presence of shadow. If it is determined at the decision block 1506 that the data point includes a cloud, the data point is identified or classified as a cloud point at a block 1508, then the routine 1500 proceeds to a decision block 1526 to determine if all the data points have been evaluated.

On the other hand, if at the decision block 1506 it is determined that the data point does not include a cloud, the routine 1500 proceeds to a decision block 1510 representing a first comparison of a spectral measurement with a spectral measurement threshold to determine a presence of a shadow. At the decision block 1510 the near infrared reflectance (NIR) is compared with a near infrared reflectance threshold of 0.25. If the NIR is less than the NIR threshold of 0.25, the data point potentially includes a shadow point and the routine 1500 proceeds to a decision block 1512 for further analysis. On the other hand, if it is determined at the decision block 1510 that the NIR is equal to or exceeds the NIR threshold of 0.25, the data point will not be a shadow point and the routine 1500 proceeds to a block 1524 where the data point is identified as a non-shadow ground point.

At the decision block 1512, the short-wavelength infrared reflectance (SWIR) is compared with an SWIR reflectance threshold value of approximately 0.25. If the SWIR reflectance is less than the SWIR reflectance threshold of 0.25, the data point potentially includes a shadow point and the routine 1500 proceeds to a decision block 1514 for further analysis. On the other hand, if it is determined at the decision block 1512 that the SWIR reflectance is equal to or exceeds the SWIR reflectance threshold of 0.25, the data point will not be a shadow point and the routine 1500 proceeds to a block 1524 where the data point is identified as a non-shadow ground point.

Note that these NIR and SWIR reflectance thresholds are empirical and are dependent upon landcover type, location, and time of year. Land cover surfaces, however, generally present reflectances in the 0.25 to 0.5 range under Solar illumination at the NIR and SWIR wavelengths. Examination of a representative set of ten middle-latitude, mostly Summertime images revealed that the combination of 0.25 reflectance thresholds in NIR and SWIR was quite effective, in combination with the other routine 1500 tests, in identifying shadows. Adjustment of these thresholds for other landcover types, locations, and times of year may be accomplished by analysis of representative sets of imagery in comparison with shadow masks prepared by an expert analyst.

At the decision block 1514, a blue band reflectance to green band reflectance ratio is compared with a blue/green reflectance ratio threshold as previously described. If the blue/green reflectance ratio does not exceed the blue/green reflectance ratio threshold, the data point is eliminated as unlikely to be a shadow-covered point and the routine 1500 proceeds to the block 1524 where the data point is identified as a non-shadow ground point. On the other hand, if it is determined at the decision block 1514 that the blue/green reflectance ratio exceeds the blue/green reflectance ratio threshold, the data point potentially may include a shadow-covered point, and the routine proceeds to a decision block 1516 for further evaluation.

At the decision block 1516, a blue band reflectance divided by the SWIR1 reflectance is compared with a blue reflectance to SWIR1 reflectance ratio threshold that is approximately equal to 2.0. If the blue/SWIR1 reflectance ratio does not exceed the blue/SWIR1 reflectance ratio threshold, the data point is eliminated as unlikely to be a shadow-covered point and the routine 1500 proceeds to the block 1524 where the data point is identified as a non-shadow ground point. On the other hand, if it is determined at the decision block 1516 that the blue/SWIR1 reflectance ratio is less than the blue/SWIR1 reflectance ratio threshold, the data point potentially may include a shadow-covered point, and the routine proceeds to a decision block 1518 for further evaluation. (SWIR1 in this example represents the Landsat-like short wave infra-red band centered near 1.6 microns.)

At the decision block 1518 a NDVI measurement is compared to a NDVI dark water body threshold which, in this case, is approximately zero as previously described. If the NDVI does not exceed the NDVI threshold, the data point is eliminated as unlikely to be a shadow-covered point over a ground background and the routine 1500 proceeds to the block 1524 where the data point is identified as a non-shadow ground point. On the other hand, if it is determined at the decision block 1518 that the NDVI is greater than zero, the data point potentially may include a shadow-covered point, and the routine proceeds to a decision block 1520 for further evaluation.

At the decision block 1520, a test is provided to deal with the difficult situation of shadow identification in image scenes that include areas of damp, dark earth, marsh, or swamp-land. This test may be omitted for scenes that do not include these dark, damp features. At block 1520 a SWIR1 reflectance is compared with a SWIR1 reflectance threshold that includes a landcover-dependent coefficient "a", ranging from 0.1 to 5, times the NIR reflectance, that product added together with the landcover-dependent coefficient "b", ranging from −1.0 to 1.0. Values of "a" and "b" may be determined by analysis of representative scenes and associated NIR vs. SWIR1 data plots in comparison with shadow masks prepared by an expert analyst. (Representative default values based upon the embodiment shown in FIG. 13 are a=0.5 and b=−0.03) If the SWIR1 reflectance exceeds the SWIR1 reflectance threshold, the data point is eliminated as unlikely to be a shadow-covered point and the routine 1500 proceeds to the block 1524 where the data point is identified as a non-shadow ground point. On the other hand, if it is determined at the decision block 1520 that the SWIR1 reflectance is less than the SWIR1 reflectance threshold, in combination with the determinations made at the decision blocks 1510, 1512, 1514, 1516, and 1518, the data point is classified as a shadow point at a block 1524.

At the decision block 1526, it is determined if all the data points have been evaluated. If not, the routine 1500 loops to the block 1504 for input of the next data point. On the other hand, if it is determined at the decision block 1526 that all the data points have been evaluated, the routine 1500 ends at a block 1528.

The routine 1500 suitably may be shortened to tailor the routine to the types of scenes present in processed imagery and to conserve computing resources. More specifically, comparisons made at the decision blocks 1518 and/or 1520 may be eliminated for processing imagery that contain no significant deep, dark water bodies or damp, or swampy terrain, such that, if the comparison at the decision block 1516 indicates that the blue/SWIR1 reflectance ratio is less than the blue/SWIR1 reflectance ratio threshold, the data point is classified as a shadow point at the block 1524.

Figure 16:
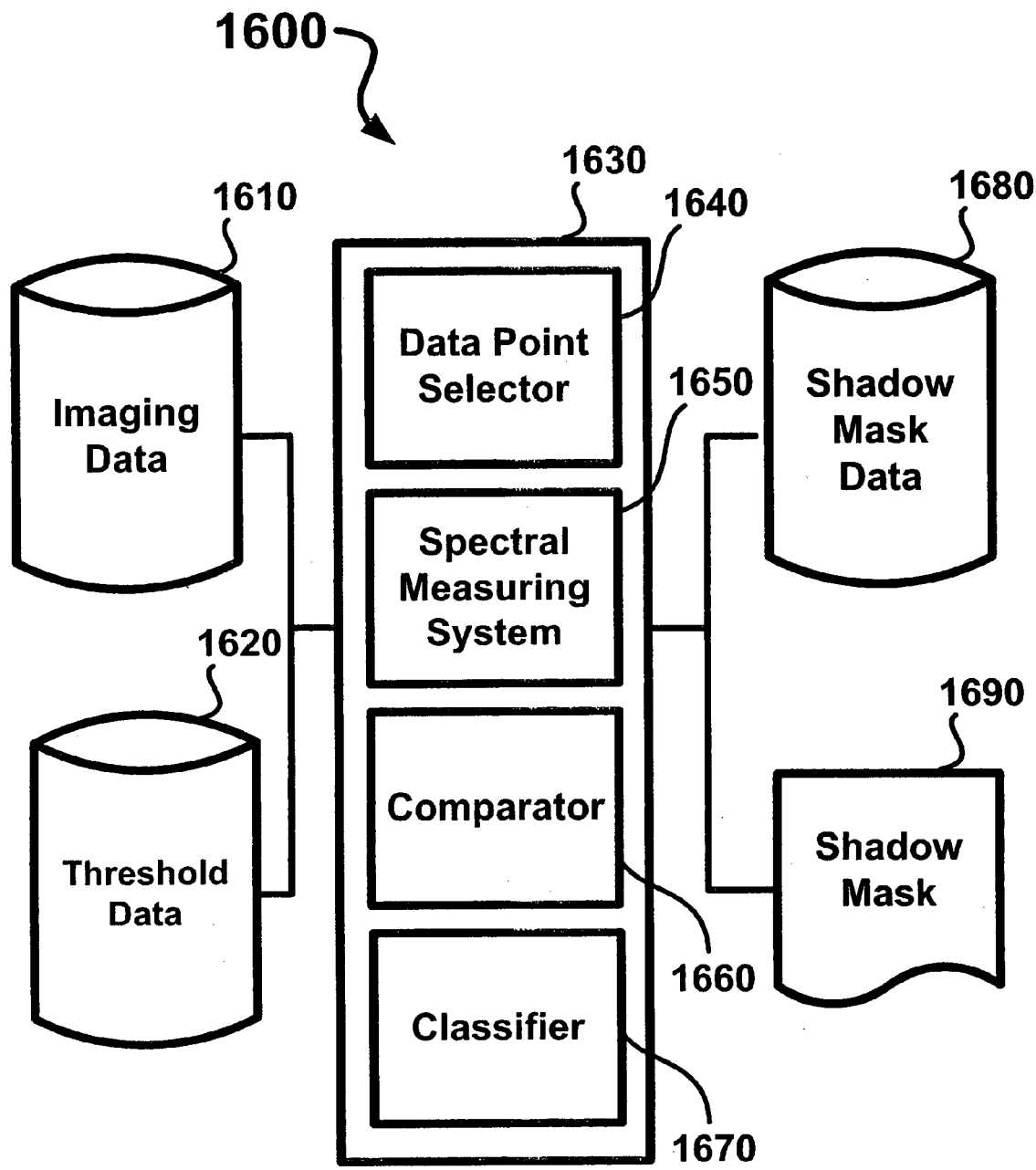
FIG. 16 is a block diagram of a system according to an embodiment of the present invention for detecting shadows.

FIG. 16 is a block diagram of a system 1600 according to an embodiment of the present invention for detecting shadows using routines described above. Imaging data 1610, including imaging data from at least one data point, is received. A set of threshold data 1620, such as the parameters previously described in connection with FIGS. 14 and 15, is supplied to the system for analysis. An analyzer 1630 receives the data 1610 and 1620. The analyzer includes four principal components. A data point selector 1640 receives data points from the imaging data 1610. A spectral measuring system 1650 derives spectral measurements described in connection with the routines 1400 (FIG. 14) and 1500 (FIG. 15). A comparator 1660 compares the spectral measurements generated by the spectral measuring system 1650 with corresponding threshold data drawn from the threshold data 1620. Depending upon one or more comparisons made by the comparator 1660, the data point is classified as including a shadow point or a non-shadow point.

Outputs generated by the analyzer 1630 include shadow mask data 1680 and a shadow mask 1690. The shadow mask data 1620 and the shadow mask 1690 are used in connection with imaging data to eliminate potential errors or misinterpretations caused by incorrect classifications of data points as including or not including shadow points. These shadow mask data may also be used as inputs to added-value information product generation routines, to indicate that shadow corrections must be applied before land cover information products may be accurately generated for data points lying within shadowed areas. Automatic detection of shadow points thus improves analysis of imaging data.

It should be understood that the system 1600 shown in FIG. 16 may have a variety of alternate embodiments, and that the invention is not limited to the particular system embodiment shown in FIG. 16. For example, one or more of the various components of the system 1600 may be combined with other components, or may be divided into separate components, to produce alternate embodiments of systems in accordance with the present invention. Alternately, in a representative embodiment, the system 900 includes a computer having a central processing unit (CPU) and a memory component. The memory component may include one or more memory modules, such as Random Access Memory (RAM) modules, Read Only Memory (ROM) modules, Dynamic Random Access Memory (DRAM) modules, and any other suitable memory modules. The computer may also include an input/output (I/O) component that may include a variety of known I/O devices, including network connections, video and graphics cards, disk drives or other computer-readable media drives, displays, or any other suitable I/O modules. In one particular aspect, a machine-readable medium may be used to store a set of machine-readable instructions (e.g. a computer program) into the computer, wherein the machine-readable instructions embody a method in accordance with the teachings of the present invention. The machine-readable medium may be any type of medium that can store data that is readable by the computer, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 1600. Alternately, the machine-readable instructions may be implemented directly into one or more components of the system 1600 without the assistance of the machine-readable medium. In addition, the system 1600 suitably is combined with a separate cloud detector to generate mask data for both clouds and shadows.

While preferred and alternate embodiments of the invention have been illustrated and described, as noted above, many changes can be made without departing from the spirit and invention. Accordingly, the scope of the invention is not limited by the preferred embodiment. Instead, the invention should be determined entirely to the claims that follow.

What is claimed is:

1. A method for determining whether a data point of an imaging study indicates a presence of a shadow-covered ground point using data including visible, near-infrared, and short wavelength infrared data, the method comprising:

acquiring one or more spectral data thresholds from at least one of a plurality of spectral data measurements and a plurality of spectral indices of a reference data point;

selecting a data point from top of atmosphere data from an imaging study of an area potentially covered by a cloud shadow;

deriving one or more spectral indices from the data point, the spectral indices being derived from at least one of visible, near infrared, and short wavelength infrared data;

obtaining one or more spectral data measurements associated with the data point, the spectral data measurements including at least one of visible, near-infrared, and short wavelength infrared data;

comparing at least one of the one or more obtained spectral data measurements and one or more derived spectral indices with one or more corresponding spectral data thresholds, the spectral data thresholds delineating between a shadow-covered ground point and a non-shadow-covered ground point; and classifying the data point as one of a shadow-covered ground point and a non-shadow covered ground based on the comparison with the spectral data thresholds.

2. The method of claim 1, further comprising determining whether the data point indicates the presence of a cloud.

3. The method of claim 1, further comprising converting the at sensor (top of atmosphere) data from calibrated radiance values to reflectance values so that variations due to solar elevation angle are avoided.

4. The method of Cairn 1, further comprising performing a plurality of comparisons of spectral data measurements and derived spectral indices with a plurality of corresponding spectral data thresholds and classifying the data point as a shadow-covered point only when each of the comparisons indicates the data point includes a shadow-covered ground point.

5. The method of claim 4, wherein the data point potentially includes a shadow-covered ground point when a normalized difference snow index exceeds a normalized difference snow index cloud threshold.

6. The method of claim 5, wherein the normalized difference snow index includes:

$$NDSI=(\rho_{Green}-\rho_{SWIR1})/(\rho_{Green}+\rho_{SWIR1}).$$

7. The method of claim 4, wherein the data point potentially includes a shadow-covered ground point when a D variable exceeds a D variable cloud threshold multiplied by a positive landcover-type-dependent factor.

8. The method of claim 7, wherein the D variable is:

$$D=|NDVI|^{0.6}/(\rho_{Red})^2$$

and where the normalized difference vegetation index, NDVI, is:

$$NDVI=(\rho_{NIR}-\rho_{Red})/(\rho_{NIR}+\rho_{Red}).$$

9. The method of claim 4, wherein the data point potentially includes a shadow-covered ground point when a blue/green reflectance ratio exceeds a blue/green reflectance ratio threshold.

10. The method of claim 9, wherein the blue/green reflectance ratio threshold is approximately 1.1.

11. The method of claim 4, wherein the data point potentially includes a shadow-covered ground point when a normalized difference vegetation index, NDVI, exceeds a normalized difference vegetation index threshold of approximately zero.

12. The method of claim 4, wherein the plurality of comparisons of spectral data measurements with a plurality of corresponding spectral data thresholds result in the data point being classified as a shadow-covered point with snow background when:

comparing a normalized difference snow index with a normalized difference snow index snow threshold;

comparing a D variable with a D variable cloud threshold multiplied by a positive landcover-type-dependent factor;

comparing a blue/green reflectance ratio with a blue/green reflectance ratio threshold of approximately 1.1; and comparing a normalized difference vegetation index with a normalized difference vegetation index threshold of approximately zero, all indicate the data point includes a shadow-covered point having a snow background.

13. The method of claim 4, wherein the data point potentially includes a shadow-covered ground point when a normalized difference snow cloud index exceeds a normalized difference snow index cloud threshold plus the absolute value of a normalized difference snow index cloud threshold multiplied by a landcover-type-dependent factor and is less than a normalized difference snow index snow threshold.

14. The method of claim 4, wherein the data point potentially includes a shadow-covered ground point when a D variable exceeds a D variable cloud threshold multiplied by a landcover-type-dependent factor.

15. The method of claim 4, wherein the data point potentially includes a shadow-covered ground point when a normalized difference vegetation index, NDVI, exceeds a normalized difference vegetation index threshold of approximately zero.

16. The method of claim 4, wherein the plurality of comparisons of spectral data measurements with a plurality of corresponding spectral data thresholds result in the data point being classified as a shadow-covered ground point when:
  comparing a normalized difference snow index with a normalized difference snow index cloud threshold plus the absolute value of a normalized difference snow index cloud threshold multiplied by a landcover-type-dependent factor and is less than a normalized difference snow index snow threshold;
  comparing a D variable with a D variable cloud threshold multiplied by a landcover-type-dependent factor;
  comparing a blue/green reflectance ratio with a blue/green reflectance ratio threshold of approximately 1.1; and
  comparing a normalized difference vegetation index with a normalized difference vegetation index threshold of approximately zero,
all indicate the data point includes a shadow-covered point having a non-snow background.

17. The method of claim 4, wherein the data point potentially includes a shadow-covered ground point when a near-infrared reflectance exceeds a near-infrared reflectance threshold.

18. The method of claim 17, wherein the near-infrared reflectance threshold equals approximately 0.25.

19. The method of claim 4, wherein the data point potentially includes a shadow-covered ground point when a short-wavelength infrared reflectance is less than a short-wavelength infrared reflectance threshold.

20. The method of claim 19, wherein the short-wavelength infrared reflectance threshold equals approximately 0.25.

21. The method of claim 4, wherein the data point potentially includes a shadow-covered ground point when a blue reflectance divided by a short-wavelength infrared reflectance exceeds a blue reflectance to short-wavelength infrared reflectance ratio threshold.

22. The method of claim 21, wherein the blue/short-wavelength infrared reflectance ratio threshold equals approximately 2.0.

23. The method of claim 4, wherein the plurality of comparisons of spectral data measurements with a plurality of corresponding spectral data thresholds result in the data point being classified as a shadow-covered ground point when:
  comparing a near-infrared reflectance with a near-infrared reflectance threshold;
  comparing a short-wavelength infrared reflectance with a short-wavelength infrared reflectance threshold;
  comparing a blue/green reflectance ratio with a blue/green reflectance ratio threshold; and
  comparing a blue reflectance divided by a short-wavelength infrared reflectance with a blue/short-wavelength infrared reflectance ratio threshold,
all indicate the data point includes a shadow-covered ground point.

24. The method of claim 23, further comprising classifying the data point as a shadow-covered point only also when a comparison of a normalized difference vegetation index, NDVI, exceeds approximately zero.

25. The method of claim 24, further comprising classifying the data point as a shadow-covered point only also when a comparison of a first landcover-dependent factor multiplied by a near infrared reflectance plus a second landcover-dependent factor exceeds a short-wavelength infrared reflectance.

26. The method of claim 1, further comprising not evaluating the data point as a potential shadow-covered ground point when the data point includes a cloud point.

27. The method of claim 1, wherein the method is iterated for each of a number of data points in a set of imaging data.

28. A method for determining whether a data point of an imaging study indicates a presence of a shadow-covered point using data including visible, near-infrared, and short wavelength infrared data, the method comprising:
  acquiring one or more spectral data thresholds from at least one of a plurality of spectral data measurements and a plurality of spectral indices of a reference data point;
  selecting a data point from top of atmosphere data from an imaging study of an area potentially covered by a cloud shadow;
  deriving a plurality of spectral indices from the data point, the plurality of spectral indices being derived from at least one of visible, near infrared, and short wavelength infrared data;
  obtaining a plurality of spectral data measurements associated with the data point, the spectral data measurements including at least one of visible, near-infrared, and short wavelength infrared data;
  comparing at least some of the obtained spectral data measurements and derived spectral indices with corresponding spectral data thresholds; and
  classifying the data point as one of a shadow-covered point when:
    comparing a normalized difference snow index with a normalized difference snow index snow threshold;
    comparing a D variable with a D variable cloud threshold multiplied by a positive landcover-type-dependent factor;
    comparing a blue/green reflectance ratio with a blue/green reflectance ratio threshold; and
    comparing a normalized difference vegetation index with a normalized difference vegetation index threshold of approximately zero,
all indicate the data point includes a shadow-covered point having a snow background.

29. A method for determining whether a data point of an imaging study indicates a presence of a shadow-covered ground point using data including visible, near-infrared, and short wavelength infrared data, the method comprising:
  acquiring one or more spectral data thresholds from at least one of a plurality of spectral data measurements and a plurality of spectral indices of a reference data point;
  selecting a data point from top of atmosphere data from an imaging study of an area potentially covered by a cloud shadow;
  deriving a plurality of spectral indices from the data point, the plurality of spectral indices being derived from at least one of visible, near infrared, and short wavelength infrared data;
  obtaining a plurality of spectral data measurements associated with the data point, the spectral data measurements including at least one of visible, near-infrared, and short wavelength infrared data;
  comparing at least some of the obtained spectral data measurements and derived indices with corresponding spectral data thresholds; and classifying the data point as one of a shadow-covered ground point when:
    comparing a normalized difference snow index with a normalized difference snow index cloud threshold plus the absolute value of a normalized difference snow index cloud threshold multiplied by a land-cover-type-dependent factor, and is less than a normalized difference snow index snow threshold;
    comparing a D variable with a D variable cloud threshold multiplied by a landcover-type-dependent factor;
    comparing a blue/green reflectance ratio with a blue/green reflectance ratio threshold; and
    comparing a normalized difference vegetation index with a normalized difference vegetation index threshold of approximately zero,
all indicate the data point includes a shadow-covered point having a non-snow background.

30. A method for determining whether a data point of an imaging study indicates a presence of a shadow-covered ground point using data including visible, near-infrared, and short wavelength infrared data, the method comprising:
    acquiring a plurality of spectral reflectance thresholds from a plurality of spectral reflectance measurements of a reference data point;
    selecting a data point from top of atmosphere data from an imaging study of an area potentially covered by a cloud shadow;
    obtaining a plurality of spectral reflectance measurements associated with the data point, the spectral reflectance measurements including at least one of visible, near-infrared, and short wavelength infrared data;
    comparing each of the obtained spectral reflectance measurement with a corresponding spectral reflectance threshold; and
    classifying the data point as one of a shadow-covered ground point when:
        comparing a near-infrared reflectance with a near-infrared reflectance threshold;
        comparing a short-wavelength infrared reflectance with a short-wavelength infrared reflectance threshold;
        comparing a blue/green reflectance ratio with a blue/green reflectance ratio threshold; and
        comparing a blue reflectance divided by a short-wavelength infrared reflectance with a blue reflectance to short-wavelength infrared reflectance ratio threshold,
all indicate the data point includes a shadow-covered point with non-snow covered background.

31. The method of claim 30, further comprising classifying the data point as a shadow-covered point only when a normalized difference vegetation index, NDVI, also exceeds a threshold of approximately zero.

32. The method of claim 31, further comprising classifying the data point as a shadow-covered point only when, in an additional comparison, a first landcover-dependent factor multiplied by a near infrared reflectance for the data point plus a second landcover-dependent factor exceeds a short-wavelength infrared reflectance for the data point.

33. A computer-readable medium having stored thereon instructions for determining whether a data point of an imaging study indicates a presence of a shadow-covered ground point using data including visible, near-infrared, and short wavelength infrared data, the computer-readable medium comprising:
    a first computer program portion configured to acquire one more spectral data thresholds from at least one of a plurality of spectral data measurements and a plurality of spectral indices of a reference data point;
    a second computer program portion configured to select a data point from top of atmosphere data from an imaging study of an area potentially covered by a cloud shadow;
    a third computer program portion configured to derive one or more spectral indices from the data point, the one or more spectral indices being derived from at least one of visible, near infrared, and short wavelength infrared data;
    a fourth computer program portion configured to obtain one or more spectral data measurements associated with the data point, the spectral data measurements including at least one of visible, near-infrared, and short wavelength infrared data;
    a fifth computer program portion configured to compare at least one of the one or more obtained spectral data measurements and one or more derived spectral indices with one or more corresponding spectral data thresholds, the spectral data thresholds delineating between a shadow-covered ground point and a non-shadow-covered ground point; and
    a sixth computer program portion configured to classify the data point as at least one of a shadow-covered ground point and a non-shadow covered ground based on the comparison with the spectral data threshold.

34. The computer-readable medium of claim 33, further comprising a seventh computer program portion configured to determine whether the data point indicates the presence of a cloud.

35. The computer-readable medium of claim 33, further comprising an eighth computer program portion configured to convert the top of atmosphere data from calibrated radiance values to at-sensor reflectance values so that variations due to solar elevation angle are avoided.

36. The computer-readable medium of claim 33, further comprising a ninth computer program portion configured to perform a plurality of comparisons of spectral data measurements and derived indices with a plurality of corresponding spectral data thresholds and classifying the data point as a shadow-covered point only when each of the comparisons indicates the data point includes a shadow-covered ground or snow point.

37. The computer-readable medium of claim 36, wherein the data point potentially includes a shadow-covered snow background point when a normalized difference snow index exceeds a normalized difference snow index snow threshold.

38. The computer-readable medium of claim 37, wherein the normalized difference snow index includes:

$NDSI=(\rho_{Green}-\rho_{SWIR1})/(\rho_{Green}+\rho_{SWIR1})$.

39. The computer-readable medium of claim 36, wherein the data point potentially includes a shadow-covered snow background point when a D variable exceeds a D variable cloud threshold multiplied by a positive landcover-type-dependent factor.

40. The computer-readable medium of claim 39, wherein the D variable is:

$D=|NDVI|^{0.6}/(\rho_{Red})^2$ and where the normalized difference vegetation index, NDVI, is:

$NDVI=(\rho_{NIR}-\rho_{Red})/(\rho_{NIR}+\rho_{Red})$.

41. The computer-readable medium of claim 36, wherein the data point potentially includes a shadow-covered snow background point when a blue/green reflectance ratio exceeds a blue/green reflectance ratio threshold.

42. The computer-readable medium of claim 41, wherein the blue/green reflectance ratio threshold equals approximately 1.1.

43. The computer-readable medium of claim 36, wherein the data point potentially includes a shadow-covered snow background point when a normalized difference vegetation index, NDVI, exceeds a normalized difference vegetation index threshold of approximately zero.

44. The computer-readable medium of claim 36, wherein the plurality of comparisons of spectral data measurements and derived spectral indices with a plurality of corresponding spectral data thresholds result in the data point being classified as a shadow-covered snow background point when:
   comparing a normalized difference snow index with a normalized difference snow index snow threshold;
   comparing a D variable with a D variable cloud threshold multiplied by a positive landcover-type-dependent factor;
   comparing a blue/green reflectance ratio with a blue/green reflectance ratio threshold of approximately 1.1; and
   comparing a normalized difference vegetation index with a normalized difference vegetation index threshold of approximately zero,
all indicate the data point includes a shadow-covered point having a snow background.

45. The computer-readable medium of claim 36, wherein the data point potentially includes a shadow-covered ground point when a normalized difference snow index exceeds a normalized difference snow index cloud threshold plus the absolute value of a normalized difference snow index cloud threshold multiplied by a positive landcover-type-dependent factor, and is less than a normalized difference snow index snow threshold.

46. The computer-readable medium of claim 36, wherein the data point potentially includes a shadow-covered ground point when a D variable exceeds a D variable cloud threshold multiplied by a landcover-type-dependent factor.

47. The computer-readable medium of claim 36, wherein the data point potentially includes a shadow-covered ground point when a normalized difference vegetation index, NDVI, exceeds a normalized difference vegetation index threshold of approximately zero.

48. The computer-readable medium of claim 36, wherein the plurality of comparisons of spectral data measurements and derived spectral indices with a plurality of corresponding spectral data thresholds result in the data point being classified as a shadow-covered snow background point includes comparing a blue/green reflectance ratio with a blue/green reflectance ratio threshold of approximately 1.1.

49. The computer-readable medium of claim 36, wherein the plurality of comparisons of spectral data measurements and selected derived spectral indices with a plurality of corresponding spectral data thresholds results in classifying the data point as a shadow-covered point when:
   comparing a normalized difference snow index with a normalized difference snow index cloud threshold plus the absolute value of a normalized difference snow index cloud threshold multiplied by a landcover-type-dependent factor and is less than a normalized difference snow index snow threshold;
   comparing a D variable with a D variable cloud threshold multiplied by a landcover-type-dependent factor;
   comparing a blue/green reflectance ratio with a blue/green reflectance threshold of approximately 1.1; and
   comparing a normalized difference vegetation index with a normalized difference vegetation index threshold of approximately zero,
all indicate the data point includes a shadow-covered point having a non-snow background.

50. The computer-readable medium of claim 36, wherein the data point potentially includes a shadow-covered ground point when a near-infrared reflectance is less than a near-infrared reflectance threshold.

51. The computer-readable medium of claim 50, wherein the near-infrared reflectance threshold equals approximately 0.25.

52. The computer-readable medium of claim 36, wherein the data point potentially includes a shadow-covered ground point when a short-wavelength infrared reflectance is less than a short-wavelength infrared reflectance threshold.

53. The computer-readable medium of claim 52, wherein the short-wavelength infrared reflectance threshold equals approximately 0.25.

54. The computer-readable medium of claim 36, wherein the data point potentially includes a shadow-covered ground point when a blue/green reflectance ratio exceeds a blue/green reflectance ratio threshold of approximately 1.1.

55. The computer-readable medium of claim 36, wherein the data point potentially includes a shadow-covered ground point when the blue/short-wavelength infrared reflectance ratio exceeds a blue/short-wavelength infrared reflectance ratio threshold of approximately 2.0.

56. The computer-readable medium of claim 36, further comprising a tenth computer program portion configured to classify the data point as a shadow-covered point only when a comparison of a normalized difference vegetation index NDVI also exceeds approximately zero.

57. The computer-readable medium of claim 36, further comprising a tenth computer program portion configured to classify the data point as a shadow-covered point only also when a comparison of a first landcover-dependent factor multiplied by a near infrared reflectance plus a second landcover-dependent factor exceeds a short-wavelength infrared reflectance.

58. The computer-readable medium of claim 36, wherein the plurality of comparisons of spectral data measurements with a plurality of corresponding spectral data thresholds and classifying the data point as a shadow-covered point when:
   comparing a near-infrared reflectance with a near-infrared reflectance threshold;
   comparing a short-wavelength infrared reflectance with a short-wavelength infrared reflectance threshold;
   comparing a blue/green reflectance ratio with a blue/green reflectance ratio threshold; and
   comparing a blue reflectance divided by a short-wavelength infrared reflectance with a blue reflectance to short-wavelength infrared reflectance ratio threshold,
all indicate the data point includes a shadow-covered ground point.

59. The computer-readable medium of claim 58, further comprising a tenth computer program portion configured to classify the data point as a shadow-covered point only when a comparison of a normalized difference vegetation index, NDVI, also exceeds approximately zero.

60. The computer-readable medium of claim 59, further comprising an eleventh computer program portion configured to classify the data point as a shadow-covered point only when a comparison of a first landcover-dependent factor multiplied by a near infrared reflectance plus a second landcover-dependent factor also exceeds a short-wavelength infrared reflectance.

61. The computer-readable medium of claim 33, further comprising a twelfth computer program portion configured to choose not to evaluate the data point as a potential shadow-covered ground point when the data point includes a cloud point.

62. The computer-readable medium of claim 33, wherein the computer-readable medium is iterated for each of a number of data points in a set of imaging data.

63. A computer-readable medium having stored thereon instructions for determining whether a data point of an imaging study indicates a presence of a shadow-covered ground point using data including visible, near-infrared, and short wavelength infrared data, the computer-readable medium comprising:

a first computer program portion configured to acquire one or more spectral data thresholds from at least one of a plurality of spectral data measurements and a plurality of spectral indices of a reference data point;

a second computer program portion configured to select a data point from top of atmosphere data from an imaging study of an area potentially covered by a cloud shadow;

a third computer program portion configured to derive one or more spectral indices from the data point, the one or more spectral indices being derived from at least one of visible, near infrared, and short wavelength infrared data;

a fourth computer program portion configured to obtain a plurality of spectral data measurements associated with the data point, the spectral data measurements including at least one of visible, near-infrared, and short wavelength infrared data;

a fifth computer program portion configured to compare at least some of the obtained spectral data measurements and derived spectral indices with corresponding spectral data thresholds; and a sixth computer program portion configured to classify the data point as one of a shadow-covered snow background point when:

comparing a normalized difference snow index with a normalized difference snow index snow threshold;

comparing a D variable with a D variable cloud threshold multiplied by a positive landcover-type-dependent factor;

comparing a blue/green reflectance ratio with a blue/green reflectance ratio threshold; and comparing a normalized difference vegetation index with a normalized difference vegetation index threshold, all indicate the data point includes a shadow-covered point having a snow background.

64. A computer-readable medium having stored thereon instructions for determining whether a data point of an imaging study indicates a presence of a shadow-covered ground point using data including visible, near-infrared, and short wavelength infrared data, the computer-readable medium comprising:

a first computer program portion configured to acquire one or more spectral data thresholds from at least one of a plurality of spectral data measures and a plurality of spectral indices of a reference data point;

a second computer program portion configured to select a data point from top of atmosphere data from an imaging study of an area potentially covered by a cloud shadow;

a third computer program portion configured to derive one or more spectral indices from the data point, the one or more spectral indices being derived from at least one of visible, near infrared, and short wavelength infrared data;

a fourth computer program portion adapted to obtain a plurality of spectral data measurements associated with the data point, the spectral data measurements including at least one of visible, near-infrared, and short wavelength infrared data;

a fifth computer program portion configured to compare at least some of the obtained spectral data measurements and derived spectral indices with corresponding spectral data thresholds; and a sixth computer program portion configured to classify the data point as one of a shadow-covered ground point when:

comparing a normalized difference snow cloud index with a normalized difference snow index cloud threshold plus the absolute value of a normalized difference snow index cloud threshold multiplied by a landcover-type-dependent factor and is less than a normalized difference snow index snow threshold;

comparing a D variable with a D variable cloud threshold multiplied by a landcover-type-dependent factor;

comparing a blue/green reflectance ratio with a blue/green reflectance ratio threshold; and comparing a normalized difference vegetation index with a normalized difference vegetation index threshold of approximately zero, all indicate the data point includes a shadow-covered point having a non-snow background.

65. A computer-readable medium having stored thereon instructions for determining whether a data point of an imaging study indicates a presence of a shadow-covered ground point using data including visible, near-infrared, and short wavelength infrared data, the computer-readable medium comprising:

a first computer program portion configured to acquire a plurality of spectral reflectance thresholds from a plurality of spectral reflectance measurements of a reference data point;

a second first computer program portion configured to select a data point from top of atmosphere data from an imaging study of an area potentially covered by a cloud shadow;

a third computer program portion configured to obtain a plurality of spectral reflectance measurements associated with the data point, the spectral reflectance measurement including at least one of visible, near-infrared, and short wavelength infrared data;

a fourth computer program portion configured to compare at least some of the obtained spectral reflectance measurements and derived indices with corresponding spectral reflectance thresholds; and a fifth computer program portion configured to classify the data point as one of a shadow-covered ground point when:

comparing a near-infrared reflectance with a near-infrared reflectance threshold;

comparing a short-wavelength infrared reflectance with a short-wavelength infrared reflectance threshold;

comparing a blue/green reflectance ratio with a blue/green reflectance ratio threshold; and comparing a blue reflectance divided by a short-wavelength infrared reflectance with a blue/short-wavelength infrared reflectance ratio threshold, all indicate the data point includes a shadow-covered ground point.

66. The computer-readable medium of claim 65, further comprising a sixth computer program portion configured to classify the data point as a shadow-covered point only when a comparison of a normalized difference vegetation index, NDVI, also exceeds approximately zero.

67. The computer-readable medium of claim 66, further comprising an seventh computer program portion configured to classify the data point as a shadow-covered point only when a comparison of a first landcover-dependent factor multiplied by a near infrared reflectance plus a second landcover-dependent factor also exceeds a short-wavelength infrared reflectance.

68. A system for determining whether a data point of an imaging study indicates a presence of a shadow-covered ground point using data including visible, near-infrared, and short wavelength infrared data, the system comprising:

a data point selector configured to select a data point from top of atmosphere data from an imaging study of an area potentially covered by a cloud shadow;

a spectral data measuring device configured to take at least one spectral data measurement associated with the data point, the spectral data measurement including at least one of visible, near-infrared, and short wavelength infrared data;

a comparator configured to compare at least some of the spectral data measurements and selected derived indices with spectral data thresholds, the spectral data thresholds delineating between a shadow-covered ground point and a non-shadow-covered ground point; and a classifier configured to classify the data point as one of a shadow-covered ground point and a non-shadow covered ground point based on the comparison with the spectral data thresholds.

69. The system of claim 68, further comprising a cloud detector configured to determine whether the data point indicates the presence of a cloud.

70. The system of claim 68, further comprising a data converter configured to convert the top of atmosphere data from calibrated radiance values to at-sensor (top of atmosphere) reflectance values so that variations due to solar elevation angle are avoided.

71. The system of claim 68, wherein the comparator is further configured to perform a plurality of comparisons of spectral data measurements and derived indices with a plurality of corresponding spectral data thresholds and classifying the data point as a shadow-covered point only when each of the comparisons indicates the data point includes a shadow-covered ground point.

72. The system of claim 71, wherein the classifier is configured potentially to classify the data point as a shadow-covered point with snow background when a normalized difference snow index exceeds a normalized difference snow index snow threshold.

73. The system of claim 72, wherein the normalized difference snow index s includes:

$$NDSI = (\rho_{Green} - \rho_{SWIR1})/(\rho_{Green} + \rho_{SWIR1}).$$

74. The system of claim 71, wherein the classifier is configured to potentially classify the data point as a shadow-covered point with snow background when a D variable exceeds a D variable cloud threshold multiplied by z positive landcover-type-dependent factor.

75. The system of claim 74, wherein the D variable is:

$$D = |NDVI|^{0.6}/(\rho_{Red})^2$$

and where the normalized difference vegetation index, NDVI, is:

$$NDVI = (\rho_{NIR} - \rho_{Red})/(\rho_{NIR} + \rho_{Red}).$$

76. The system of claim 71, wherein the classifier is configured potentially to classify the data point as a shadow-covered ground point when a blue/green reflectance ratio exceeds a blue/green reflectance ratio threshold.

77. The system of claim 76, wherein the blue/green reflectance ratio threshold equals approximately 1.1.

78. The system of claim 71, wherein the classifier is configured potentially to classify the data point as a shadow-covered ground point when a normalized difference vegetation index, NDVI, exceeds a normalized difference vegetation index threshold of approximately zero.

79. The system of claim 71, wherein the classifier is configured potentially to classify the data point as a shadow-covered point with snow background when:

comparing a normalized difference snow index with a normalized difference snow index snow threshold;

comparing a D variable with a D variable cloud threshold multiplied by a positive landcover-type-dependent factor;

comparing a blue/green reflectance ratio with a blue/green reflectance threshold; and comparing a normalized difference vegetation index with a normalized difference vegetation index threshold of approximately zero, all indicate the data point includes a shadow-covered point having a snow background.

80. The system of claim 71, wherein the classifier is configured potentially to classify the data point as a shadow-covered ground point when a normalized difference snow index exceeds a normalized difference snow index cloud threshold plus the absolute value of a normalized difference snow index cloud threshold multiplied by a landcover-type-dependent factor and is less than a normalized difference snow index snow threshold.

81. The system of claim 71, wherein the classifier is configured potentially to classify the data point as a shadow-covered ground point when a D variable exceeds a D variable cloud threshold multiplied by a landcover-type-dependent factor.

82. The system of claim 71, wherein the classifier is configured potentially to classify the data point as a shadow-covered ground point when a normalized difference vegetation index, NDVI, exceeds a normalized difference vegetation index threshold of approximately zero.

83. The system of claim 71, wherein the classifier is configured potentially to classify the data point as a shadow-covered ground point when:

comparing a normalized difference snow index with a normalized difference snow index cloud threshold plus the absolute value of a normalized difference snow index cloud threshold multiplied by a landcover-type-dependent factor and is less than a normalized difference snow index snow threshold;

comparing a D variable with a D variable cloud threshold multiplied by a landcover-type-dependent factor;

comparing a blue/green reflectance ratio with a blue/green reflectance ratio threshold; and comparing a normalized difference vegetation index with a normalized difference vegetation index threshold of approximately zero, all indicate the data point includes a shadow-covered point having a non-snow background.

84. The system of claim 71, wherein the classifier is configured potentially to classify the data point as a shadow-covered ground point when a near-infrared reflectance exceeds a near-infrared reflectance threshold.

85. The system of claim 84, wherein the near-infrared reflectance threshold equals approximately 0.25.

86. The system of claim 71, wherein the classifier is configured potentially to classify the data point as a shadow-covered ground point when a short-wavelength infrared reflectance is less than a short-wavelength infrared reflectance threshold.

87. The system of claim 86, wherein the short-wavelength infrared reflectance threshold equals approximately 0.25.

88. The system of claim 86, wherein comparing a blue/green reflectance ratio with a blue/green reflectance ratio threshold includes comparing a blue/green reflectance ratio with a threshold of approximately 1.1.

89. The system of claim 71, wherein the classifier is configured potentially to classify the data point as a shadow-covered ground point when a blue reflectance divided by a short wavelength infrared reflectance exceeds a blue/short-wavelength infrared reflectance ratio threshold.

90. The system of claim 89, wherein the blue/short-wavelength infrared reflectance ratio threshold equals approximately 2.0.

91. The system of claim 71, wherein the classifier is configured potentially to classify the data point as a shadow-covered ground point when:
comparing a near-infrared reflectance with a near-infrared reflectance threshold;
comparing a short-wavelength infrared reflectance with a short-wavelength infrared reflectance threshold;
comparing a blue/green reflectance ratio with a blue/green reflectance ratio threshold; and
comparing a blue reflectance divided by a short-wavelength infrared reflectance with a blue/short-wavelength infrared reflectance ratio threshold, all indicate the data point includes a shadow-covered ground point.

92. The system of claim 91, wherein the classifier is further configured potentially to classify the data point as a shadow-covered ground point when a comparison of a normalized difference vegetation index, NDVI, also exceeds approximately zero.

93. The system of claim 92, wherein the classifier is further configured to potentially classify the data point as a shadow-covered ground point when a comparison of a first landcover-dependent factor multiplied by a near infrared reflectance plus a second landcover-dependent factor also exceeds a short-wavelength infrared reflectance.

94. The system of claim 68, wherein the classifier is further configured to choose not to evaluate the data point as a potential shadow-covered ground point when the data point includes a cloud point.

95. A system for determining whether a data point of an imaging study indicates a presence of a shadow-covered ground point using data including visible, near-infrared, and short wavelength infrared data, the system comprising:
a data point selector configured to select a data point from top of atmosphere data from an imaging study of an area potentially covered by a cloud shadow;
a spectral data measuring device configured to take a plurality of spectral data measurements associated with the data point, the spectral data measurements including at least one of visible, near-infrared, and short wavelength infrared data and comparing at least one of the spectral data measurements and selected derived indices with corresponding spectral data thresholds; and
a classifier configured to classify the data point as one of a shadow-covered point with snow background when:
comparing a normalized difference snow index with a normalized difference snow index snow threshold;
comparing a D variable with a D variable cloud threshold multiplied by a positive landcover-type-dependent factor;
comparing a blue/green reflectance ratio with a blue/green reflectance ratio threshold; and
comparing a normalized difference vegetation index with a normalized difference vegetation index threshold of approximately zero,
all indicate the data point includes a shadow-covered point having a snow background.

96. A system for determining whether a data point of an imaging study indicates a presence of a shadow-covered ground point using data including visible, near-infrared, and short wavelength infrared data, the system comprising:
a data point selector configured to select a data point from top of atmosphere data from an imaging study of an area potentially covered by a cloud shadow;
a spectral data measuring device configured to take a plurality of spectral data measurements associated with the data point, the spectral data measurements including at least one of visible, near-infrared, and short wavelength infrared data and comparing at least one of the spectral data measurements and selected derived indices with corresponding spectral data thresholds; and
a classifier configured to classify the data point as one of a shadow-covered ground point when:
comparing a normalized difference snow index with a normalized difference snow index cloud threshold plus the absolute value of a normalized difference snow index cloud threshold multiplied by a landcover-type-dependent factor and is less than a normalized difference snow index snow threshold;
comparing a D variable with a D variable cloud threshold multiplied by a landcover-type-dependent factor;
comparing a blue/green reflectance ratio with a blue/green reflectance ratio threshold; and
comparing a normalized difference vegetation index with a normalized difference vegetation index threshold of approximately zero,
all indicate the data point includes a shadow-covered point having a non-snow background.

97. A system for determining whether a data point of an imaging study indicates a presence of a shadow-covered ground point using data including visible, near-infrared, and short wavelength infrared data, the system comprising:
a data point selector configured to select a data point from top of atmosphere data from an imaging study of an area potentially covered by a cloud shadow;
a spectral data measuring device configured to take a plurality of spectral data measurements associated with the data point, the spectral data measurements including at least one of visible, near-infrared, and short wavelength infrared data and comparing at least some of the spectral data measurements and selected derived indices with corresponding spectral data thresholds; and a classifier configured to classify the data point as one of a shadow-covered ground point when:
comparing a near-infrared reflectance with a near-infrared reflectance threshold;
comparing a short-wavelength infrared reflectance with a short-wavelength infrared reflectance threshold;
comparing a blue/green reflectance ratio with a blue/green reflectance ratio threshold; and comparing a blue reflectance divided by a short-wavelength infrared reflectance ratio with a blue/short-wavelength infrared reflectance ratio threshold,
all indicate the data point includes a shadow-covered ground point.

98. The system of claim 97, wherein the classifier is further configured to classify the data point as a shadow-covered ground point only when a comparison of a normalized difference vegetation index, NDVI, also exceeds approximately zero.

99. The system of claim 98, wherein the classifier is further configured to classify the data point as a shadow-covered ground point only when a comparison of a first landcover-dependent factor multiplied by a near infrared reflectance plus a second landcover-dependent factor also exceeds a short-wavelength infrared reflectance.

* * * * *